(12) United States Patent
King et al.

(10) Patent No.: US 9,532,415 B2
(45) Date of Patent: Dec. 27, 2016

(54) MULTI-MODE DIMMER INTERFACING INCLUDING ATTACH STATE CONTROL

(71) Applicant: KONINKLIJKE PHILIPS N.V.

(72) Inventors: Eric J. King, Dripping Springs, TX (US); John L. Melanson, Austin, TX (US)

(73) Assignee: Philips Lighting Hiolding B.V., Eindhoven (NL)

( * ) Notice: Subject to any disclaimer, the term of this patent is extended or adjusted under 35 U.S.C. 154(b) by 69 days.

(21) Appl. No.: 14/477,297

(22) Filed: Sep. 4, 2014

(65) Prior Publication Data
US 2015/0054418 A1 Feb. 26, 2015

Related U.S. Application Data

(62) Division of application No. 13/217,174, filed on Aug. 24, 2011, now Pat. No. 8,847,515.
(Continued)

(51) Int. Cl.
| | |
|---|---|
| H05B 39/04 | (2006.01) |
| H05B 37/02 | (2006.01) |
| H05B 33/08 | (2006.01) |

(52) U.S. Cl.
CPC .......... *H05B 33/0815* (2013.01); *H05B 37/02* (2013.01); *H05B 39/044* (2013.01); *Y10S 315/04* (2013.01)

(58) Field of Classification Search
CPC ... H05B 33/0815; H05B 37/02; H05B 39/044; Y10S 315/04
See application file for complete search history.

(56) References Cited

U.S. PATENT DOCUMENTS

| | | |
|---|---|---|
| 4,523,128 A | 6/1985 | Stamm et al. |
| 5,055,746 A | 10/1991 | Hu et al. |
| (Continued) | | |

FOREIGN PATENT DOCUMENTS

| | | |
|---|---|---|
| CN | 1421986 A | 6/2003 |
| CN | 1459216 A | 11/2004 |
| (Continued) | | |

OTHER PUBLICATIONS

Amanci, et al, "Synchronization System with Zero-Crossing Peak Detection Algorithm for Power System Applications", The 2010 International Power Electronics Conference, pp. 2984-2991, Toronto, Ontario, Canada.
(Continued)

*Primary Examiner* — Alexander H Taningco
*Assistant Examiner* — Renan Luque

(57) ABSTRACT

A system and method includes a controller that is configured to coordinate (i) a low impedance path for a dimmer current, (ii) attaching a dimmer to a power converter system at the leading edge of a phase-cut, rectified input voltage, (iii), control of switch mode power conversion, and (iv) an inactive state to, for example, reduce the dimmer current while allowing a dimmer to function normally from cycle to cycle of an alternating current (AC) supply voltage. In at least one embodiment, the dimmer functions normally when the dimmer conducts at a correct phase angle indicated by a dimmer input setting and avoids prematurely resetting while conducting. In at least one embodiment, by coordinating functions (i), (ii), (iii), and (iv) the controller controls a power converter system that is compatible with a triac-based dimmer.

19 Claims, 14 Drawing Sheets

Related U.S. Application Data

(60) Provisional application No. 61/376,504, filed on Aug. 24, 2010.

(56) References Cited

U.S. PATENT DOCUMENTS

| | | |
|---|---|---|
| 5,179,324 A | 1/1993 | Audbert |
| 5,319,301 A | 6/1994 | Callahan et al. |
| 5,321,350 A | 6/1994 | Haas |
| 5,430,635 A | 7/1995 | Liu |
| 5,604,411 A | 2/1997 | Venkitasubrahmanian et al. |
| 5,629,607 A | 5/1997 | Callahan et al. |
| 5,661,645 A | 8/1997 | Hochstein |
| 5,691,605 A | 11/1997 | Xia et al. |
| 5,770,928 A | 6/1998 | Chansky et al. |
| 6,043,635 A | 3/2000 | Downey |
| 6,046,550 A | 4/2000 | Ference et al. |
| 6,091,205 A | 7/2000 | Newman et al. |
| 6,211,624 B1 | 4/2001 | Holzer |
| 6,380,692 B1 | 4/2002 | Newman et al |
| 6,407,514 B1 | 6/2002 | Glaser et al. |
| 6,621,256 B2 | 9/2003 | Muratov et al. |
| 6,713,974 B2 | 3/2004 | Patcharnik et al. |
| 6,858,995 B2 | 2/2005 | Lee et al. |
| 6,900,599 B2 | 5/2005 | Ribarich |
| 7,102,902 B1 | 9/2006 | Brown et al. |
| 7,180,250 B1 | 2/2007 | Gannon |
| 7,184,937 B1 | 2/2007 | Su et al. |
| 7,656,103 B2 | 2/2010 | Shteynberg et al. |
| 7,719,246 B2 | 5/2010 | Melanson |
| 7,728,530 B2 | 6/2010 | Wang et al. |
| 7,733,678 B1 | 6/2010 | Notohamiprodjo et al. |
| 7,750,580 B2 | 7/2010 | Lu et al. |
| 7,759,881 B1 | 7/2010 | Melanson |
| 7,786,711 B2 | 8/2010 | Wei et al. |
| 7,872,427 B2 | 1/2011 | Scianna |
| 7,982,415 B2 | 7/2011 | Kimura |
| 8,102,167 B2 | 1/2012 | Irissou et al. |
| 8,115,419 B2 | 2/2012 | Given et al. |
| 8,169,154 B2 | 5/2012 | Thompson et al. |
| 8,212,491 B2 | 7/2012 | Kost |
| 8,212,492 B2 | 7/2012 | Lam et al. |
| 8,222,832 B2 | 7/2012 | Zheng et al. |
| 8,482,220 B2 | 7/2013 | Melanson |
| 8,487,546 B2 | 7/2013 | Melanson |
| 8,508,147 B2 | 8/2013 | Shen |
| 8,536,794 B2 | 9/2013 | Melanson et al. |
| 8,536,799 B1 | 9/2013 | Grisamore et al. |
| 8,547,034 B2 | 10/2013 | Melanson et al. |
| 8,569,972 B2 | 10/2013 | Melanson |
| 8,610,364 B2 | 12/2013 | Melanson et al. |
| 8,610,365 B2 | 12/2013 | King et al. |
| 8,664,885 B2 | 3/2014 | Koolen et al. |
| 8,716,957 B2 | 5/2014 | Melanson et al. |
| 8,749,173 B1 | 6/2014 | Melanson et al. |
| 8,847,515 B2 | 9/2014 | King et al. |
| 2002/0140371 A1 | 10/2002 | Chou et al. |
| 2004/0105283 A1 | 6/2004 | Schie et al. |
| 2004/0212321 A1 | 10/2004 | Lys |
| 2006/0022648 A1 | 2/2006 | Ben-Yaakov et al. |
| 2006/0208669 A1 | 9/2006 | Huynh et al. |
| 2007/0182338 A1 | 8/2007 | Shteynberg |
| 2007/0182347 A1 | 8/2007 | Shteynberg |
| 2008/0018261 A1 | 1/2008 | Kastner |
| 2008/0101098 A1 | 5/2008 | Disney |
| 2008/0143266 A1 | 6/2008 | Langer |
| 2008/0192509 A1 | 8/2008 | Dhuyvetter et al. |
| 2008/0203934 A1 | 8/2008 | Van Meurs |
| 2008/0205103 A1 | 8/2008 | Sutardja et al. |
| 2008/0224629 A1 | 9/2008 | Melanson |
| 2008/0224633 A1 | 9/2008 | Melanson |
| 2008/0224636 A1 | 9/2008 | Melanson |
| 2009/0134817 A1 | 5/2009 | Jurngwirth et al. |
| 2009/0135632 A1 | 5/2009 | Sohma |
| 2009/0195186 A1 | 8/2009 | Guest et al. |
| 2009/0284182 A1 | 11/2009 | Cencur |
| 2010/0002480 A1 | 1/2010 | Huynh et al. |
| 2010/0013405 A1* | 1/2010 | Thompson ......... H05B 41/3921 315/291 |
| 2010/0013409 A1 | 1/2010 | Quek et al. |
| 2010/0066328 A1 | 3/2010 | Shimizu et al. |
| 2010/0164406 A1 | 7/2010 | Kost et al. |
| 2010/0213859 A1 | 8/2010 | Shteynberg et al. |
| 2010/0231136 A1 | 9/2010 | Reisenbauer et al. |
| 2010/0244726 A1 | 9/2010 | Melanson |
| 2011/0043133 A1 | 2/2011 | Van Laanen et al. |
| 2011/0080110 A1* | 4/2011 | Nuhfer ............... H05B 33/0815 315/291 |
| 2011/0084622 A1 | 4/2011 | Barrow et al. |
| 2011/0084623 A1 | 4/2011 | Barrow |
| 2011/0115395 A1 | 5/2011 | Barrow et al. |
| 2011/0121744 A1* | 5/2011 | Salvestrini ......... H05B 33/0815 315/246 |
| 2011/0121754 A1 | 5/2011 | Shteynberg |
| 2011/0148318 A1 | 6/2011 | Shackle et al. |
| 2011/0204797 A1 | 8/2011 | Lin et al. |
| 2011/0204803 A1 | 8/2011 | Grotkowski et al. |
| 2011/0234115 A1 | 9/2011 | Shimizu et al. |
| 2011/0266968 A1 | 11/2011 | Bordin et al. |
| 2011/0291583 A1 | 12/2011 | Shen |
| 2011/0309759 A1 | 12/2011 | Shteynberg et al. |
| 2011/0316441 A1 | 12/2011 | Huynh |
| 2012/0049752 A1 | 3/2012 | King et al. |
| 2012/0068626 A1 | 3/2012 | Lekatsas et al. |
| 2012/0098454 A1 | 4/2012 | Grotkowski et al. |
| 2012/0112651 A1 | 5/2012 | King et al. |
| 2012/0133291 A1 | 5/2012 | Kitagawa et al. |
| 2012/0286686 A1 | 11/2012 | Watanabe et al. |
| 2013/0015768 A1 | 1/2013 | Roberts et al. |
| 2013/0154495 A1 | 6/2013 | Zhaihui |
| 2013/0193879 A1 | 8/2013 | Sadwick et al. |
| 2014/0009082 A1 | 1/2014 | King et al. |

FOREIGN PATENT DOCUMENTS

| | | |
|---|---|---|
| CN | 1748446 A | 3/2006 |
| CN | 1843061 A1 | 10/2006 |
| CN | 101164383 A | 4/2008 |
| CN | 101505568 A | 8/2009 |
| CN | 101707874 A | 5/2010 |
| CN | 101835314 | 9/2010 |
| CN | 101926222 | 12/2010 |
| EP | 1164819 | 12/2001 |
| EP | 2257124 A1 | 1/2010 |
| EP | 2232949 | 9/2010 |
| JP | 2008053181 A | 3/2008 |
| JP | 2009170240 A | 7/2009 |
| WO | 9917591 | 4/1999 |
| WO | 02096162 | 11/2002 |
| WO | 2006079937 | 8/2006 |
| WO | 2008029108 | 3/2008 |
| WO | 2008112822 A2 | 9/2008 |
| WO | 2010011971 A1 | 1/2010 |
| WO | 2010035155 A2 | 4/2010 |
| WO | 2011008635 A1 | 1/2011 |
| WO | 2011050453 A1 | 5/2011 |
| WO | 2011056068 A2 | 5/2011 |
| WO | 2012016197 A1 | 2/2012 |
| WO | 2010027493 A2 | 3/2012 |

OTHER PUBLICATIONS

Patterson, James, "Efficient Method for Interfacing Triac Dimmers and LEDs", National Semiconductor Corp., pp. 29-32, Jun. 23, 2011, USA.

Vainio, Olli, "Digital Filtering for Robust 50/60 Hz Zero-Crossing Detectors", IEEE Transactions on Instrumentation and Measurement, vol. 45, No. 2, pp. 426-430, Apr. 1996, University of Santa Barbara, California, USA.

Supertex, Inc., HV9931 Unity Power Factor LED Lamp Driver, pp. 1-7, 2005, Sunnyvale, California, USA.

Wang Xiao, Phase Control Dimming of the Dimmable Lighting System, Journal of Wuxi University of Light Industry, Jul. 31, 2000,

(56) References Cited

OTHER PUBLICATIONS vol. 19, No. 4, pp. 1-3. The Abstract contains a concise explanation in English and the Search Report identifies the following portions as related to the claims in the Present Application: p. 408, right-hand column, section 2, and figures 5-7.

First Office Action dated Mar. 30, 2015, mailed in Application No. 2011800408941, The State Intellectual Property Office of the People's Republic of China, pp. 1-4.

Search Report dated Mar. 9, 2015, mailed in Application No. 2011800408941, The State Intellectual Property Office of the People's Republic of China, pp. 1-2.

Response to the Written Opinion accompanying the International Report on Patentability as filed in European Patent Application No. 11760606.1 on Jan. 30, 2014, pp. 1-11.

Azoteq, IQS17 Family, IQ Switch-ProxSense Series, Touch Sensor, Load Control and User Interface, IQS17 Datasheet V2.00.doc, Jan. 2007, pp. 1-51, Azoteq (Pty) Ltd., Paarl, Western Cape, Republic of South Africa.

Chan, Samuel, et al, Design and Implementation of Dimmable Electronic Ballast Based on Integrated Inductor, IEEE Transactions on Power Electronics, vol. 22, No. 1, Jan. 2007, pp. 291-300, Dept. of Electron. Eng., City Univ. of Hong Kong.

Rand, Dustin, et al, Issues, Models and Solutions for Triac Modulated Phase Dimming of LED Lamps, Power Electronics Specialists Conference, 2007. PESC 2007. IEEE, Jun. 17-21, 2007, pp. 1398-1404, Boston, MA, USA.

Gonthier, Laurent, et al, EN55015 Compliant 500W Dimmer with Low-Losses Symmetrical Switches, ST Microelectronics, Power Electronics and Applications, 2005 European Conference, pp. 1-9, Aug. 7, 2006, Dresden.

Green, Peter, A Ballast That Can Be Dimmed from a Domestic (Phase Cut) Dimmer, International Rectifier, IRPLCFL3 rev.b, pp. 1-12, Aug. 15, 2003, El Segundo, California, USA.

Hausman, Don, Real-Time Illumination Stability Systems for Trailing-Edge (Reverse Phase Control) Dimmers, Lutron RTISS, Lutron Electronics Co, Dec. 2004, pp. 1-4, Coopersburg, PA, USA.

Lee, Stephen, et al, A Novel Electrode Power Profiler for Dimmable Ballasts Using DC Link Voltage and Switching Frequency Controls, IEEE Transactions on Power Electronics, vol. 19, No. 3, May 2004, pp. 847-833, City University of Hong Kong.

Engdahl, Tomi, Light Dimmer Circuits, 1997-2000, www.epanorama.net.

O'Rourke, Conan, et al, Dimming Electronic Ballasts, National Lighting Product Information Program, Specifier Reports, vol. 7, No. 3, Oct. 1999, pp. 1-24, Troy, NY, USA.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

Lutron, Fluorescent Dimming Systems Technical Guide, copyright 2002, Why Different Dimming Ranges, http://www.lutron.com/TechnicalDocumentLibrary/LutronBallastpg3.pdf, p. 3, Coopersburg PA, USA.

Wu, Tsai-Fu, et al, Single-Stage Electronic Ballast with Dimming Feature and Unity Power Factor, IEEE Transactions on Power Electronics, vol. 13, No. 3, May 1998, pp. 586-597.

Notice of Allowance dated Aug. 29, 2014, mailed in U.S. Appl. No. 12/217,174, pp. 1-19.

Response to Ex Parte Quayle Office Action dated Feb. 27, 2014, as filed in U.S. Appl. No. 12/217,174, filed Apr. 28, 2014, pp. 1-8.

Ex Parte Quayle Office Action dated Feb. 27, 2014, mailed in U.S. Appl. No. 12/217,174, pp. 1-34.

Notice of Non-Compliant Amendment dated Jan. 15, 2014, mailed in U.S. Appl. No. 12/217,174, pp. 1-2.

Response to Notice of Non-Compliant Amendment dated Jan. 15, 2014, as filed in U.S. Appl. No. 12/217,174, filed Jan. 15, 2014, pp. 1-10.

Response to Restriction Requirement dated Oct. 29, 2013, as filed in U.S. Appl. No. 12/217,174, filed Dec. 29, 2013, pp. 1-10.

Restriction Requirement dated Oct. 29, 2013, mailed in U.S. Appl. No. 12/217,174, pp. 1-7.

Response to the Written Opinion as filed Jan. 30, 2014, Application No. 11760606.1, European Patent Office, pp. 1-15.

* cited by examiner

MULTI-MODE DIMMER INTERFACING INCLUDING ATTACH STATE CONTROL

CROSS-REFERENCE TO RELATED APPLICATIONS

This application is a divisional of copending application Ser. No. 13/217,174, filed Aug. 24, 2011 which claims the benefit under 35 U.S.C. §119(e) and 37 C.F.R. §1.78 of U.S. Provisional Application No. 61/376,504, filed Aug. 24, 2010, and entitled "Multi-Mode Dimmer Interface for Lighting Boost Controller". These applications are incorporated herein by reference in their entireties.

BACKGROUND OF THE INVENTION

Field of the Invention

The present invention relates in general to the field of electronics, and more specifically to a method and system for providing multi-mode interfacing to a dimmer including controlling an interface to a dimmer during an attach state of a dimming cycle of the dimmer. In at least one embodiment, an attach state occurs during an initial charge transfer period of a leading edge, triac-based dimmer.

Description of the Related Art

Electronic systems utilize dimmers to modify output power delivered to a load. For example, in a lighting system, dimmers provide an input signal to a lighting system, and the load includes one or more light sources such as one or more light emitting diodes (LEDs) or one or more fluorescent light sources. Dimmers can also be used to modify power delivered to other types of loads, such as one or more motors or one or more portable power sources. The input signal represents a dimming level that causes the lighting system to adjust power delivered to a lamp, and, thus, depending on the dimming level, increase or decrease the brightness of the lamp. Many different types of dimmers exist. In general, dimmers use a digital or analog coded dimming signal that indicates a desired dimming level. For example, some analog based dimmers utilize a triode for alternating current ("triac") device to modulate a phase angle of each cycle of an alternating current ("AC") supply voltage. "Modulating the phase angle" of the supply voltage is also commonly referred to as "chopping" or "phase cutting" the supply voltage. Phase cutting the supply voltage causes the voltage supplied to a lighting system to rapidly turn "ON" and "OFF" thereby controlling the average power delivered to the lighting system.

FIG. 1 depicts a lighting system 100 that includes a leading edge dimmer 102. FIG. 2 depicts ideal, exemplary voltage graphs 200 associated with the lighting system 100. Referring to FIGS. 1 and 2, the lighting system 100 receives an AC supply voltage $V_{SUPPLY}$ from voltage supply 104. The supply voltage $V_{SUPPLY}$, indicated by voltage waveform 202, is, for example, a nominally 60 Hz/110 V line voltage in the United States of America or a nominally 50 Hz/220 V line voltage in Europe. A leading edge dimmer phase cuts leading edges, such as leading edges 204 and 206, of each half cycle of supply voltage $V_{SUPPLY}$. Since each half cycle of supply voltage $V_{SUPPLY}$ is 180 degrees of the supply voltage $V_{SUPPLY}$, a leading edge dimmer phase cuts the supply voltage $V_{SUPPLY}$ at an angle greater than 0 degrees and less than 180 degrees. Generally, the voltage phase cutting range of a leading edge dimmer 102 is 10 degrees to 170 degrees. The leading edge dimmer 102 can be any type of leading edge dimmer such as a triac-based leading edge dimmer available from Lutron Electronics, Inc. of Coopersberg, Pa. ("Lutron"). A triac-based leading edge dimmer is described in the Background section of U.S. patent application Ser. No. 12/858,164, entitled Dimmer Output Emulation, filed on Aug. 17, 2010, and inventor John L. Melanson.

Ideally, by modulating the phase angle of the dimmer output voltage $V_{\phi\_DIM}$, the leading edge dimmer 102 effectively turns the constant current lamp 122 OFF during time period $T_{OFF}$ and ON during time period $T_{ON}$ for each half cycle of the supply voltage $V_{SUPPLY}$. Thus, ideally, the dimmer 102 effectively controls the average power supplied to the constant current lamp 122 in accordance with the dimmer output voltage $V_{\phi\_DIM}$. However, in many circumstances, the leading edge dimmer 102 does not operate ideally. For example, when the constant current lamp 122 draws a small amount of current $i_{DIM}$, the current $i_{DIM}$ can prematurely drop below a holding current value HC before the supply voltage $V_{SUPPLY}$ reaches approximately zero volts. When the current $i_{DIM}$ prematurely drops below the holding current value HC, a triac-based leading edge dimmer 102 prematurely resets, i.e. prematurely disconnects (i.e. turns OFF and stops conducting), and the dimmer voltage $V_{\phi\_DIM}$ will prematurely drop to zero. An exemplary premature reset would occur if the dimmer 102 reset at time $t_3$ and the dimmer voltage $V_{\phi\_DIM}$ dropped to 0V at time $t_3$. When the dimmer voltage $V_{\phi\_DIM}$ prematurely drops to zero, the dimmer voltage $V_{\phi\_DIM}$ does not reflect the intended dimming value as set by the resistance value of variable resistor 114. The diode for alternating current ("diac") 119, capacitor 118, resistor 116, and variable resistor 114 form a timing circuit 116 that resets triac 106. Additionally, the triac 106 of leading edge dimmer 102 can reset and then conduct repeatedly, i.e. disengage (non-conductive), reengage (conductive), disengage (non-conductive), and so on repeatedly during a half-cycle of supply voltage $V_{SUPPLY}$ when the current $i_{DIM}$ is below or near the holding current value HC. A "reset-conduct" sequence occurs when the dimmer 102 resets and then conducts the supply voltage $V_{SUPPLY}$ one or more times during a single half-cycle of the supply voltage $V_{SUPPLY}$.

The lighting system 100 includes a power converter 123 with a resistor, inductor, capacitor (RLC) network 124 to convert the dimmer voltage $V_{\phi\_DIM}$ to an approximately constant voltage and, thus, provide an approximately constant current $i_{OUT}$ to the constant current lamp 122 for a given dimmer phase angle. The power converter 123 with the RLC network 124 is inefficient because of, for example, resistor-based power losses. Additionally, reactive load presented by the RLC network 124 to the dimmer 102 can cause the triac 106 to malfunction.

SUMMARY OF THE INVENTION

In one embodiment of the present invention, a method includes sensing a leading edge of a dimmer input voltage. The method further includes after the sensing the leading edge of the dimmer input voltage, actively controlling a decreasing transition of a current through a triac-based dimmer to prevent a triac of the dimmer from prematurely resetting.

In another embodiment of the present invention, a method includes generating a first signal for a power converter system upon occurrence of a leading edge of a dimmer input voltage. Generating the second signal causes the power converter system to draw a current through the dimmer that prevents the dimmer from prematurely resetting during a first portion of the dimmer input voltage following the leading edge.

In a further embodiment of the present invention, a method wherein a dimmer voltage to a power converter system comprises four states that occur from:
  A. an approximately zero volt crossing of the dimmer voltage of a dimmer until a phase cut, leading edge of the dimmer voltage;
  B. an end of state A until a steady state value of a dimmer current has reached a predetermined hold value;
  C. an end of state B until energy transferred to a load is sufficient to meet at least one energy transfer parameter; and
  D. an end of state C until a beginning of state A;
the method includes:
  for state A, enabling a low impedance path for a dimmer current of the dimmer, wherein the impedance of the low impedance path is sufficiently low to maintain a stable phase angle of the dimmer;
  for state B:
    enabling control of switch mode power conversion of the dimmer voltage;
    sensing a leading edge of a dimmer input voltage; and
    after the sensing the leading edge of the dimmer input voltage, actively controlling a decreasing transition of a current through a triac-based dimmer to prevent a triac of the dimmer from prematurely resetting;
  for state C, controlling switch mode power conversion to maintain the dimmer current above a threshold; and
  for state D, entering an inactive state, wherein during the inactive state the low impedance path and the control of mode power conversion is disabled.

In a further embodiment of the present invention, a method includes sensing a leading edge of a dimmer input voltage to a power converter system. The method further includes controlling a dimmer current in accordance with a profile that transfers energy to a power converter system to damp an inductor-capacitor circuit in a dimmer.

In an additional embodiment of the present invention, an apparatus includes a controller configured to sense a leading edge of a dimmer input voltage. The controller is further configured to, after the sensing the leading edge of the dimmer input voltage, actively control a decreasing transition of a current through a triac-based dimmer to prevent a triac of the dimmer from prematurely resetting.

In another embodiment of the present invention, an apparatus includes a controller configured to generate a first signal for a power converter system upon occurrence of a leading edge of a dimmer input voltage. Generating the second signal causes the power converter system to draw a current through the dimmer that prevents the dimmer from prematurely resetting during a first portion of the dimmer input voltage following the leading edge.

In a further embodiment of the present invention, an apparatus wherein a dimmer voltage to a power converter system comprises four states that occur from:
  A. an approximately zero volt crossing of the dimmer voltage of a dimmer until a phase cut, leading edge of the dimmer voltage;
  B. an end of state A until a steady state value of a dimmer current has reached a predetermined hold value;
  C. an end of state B until energy transferred to a load is sufficient to meet at least one energy transfer parameter; and
  D. an end of state C until a beginning of state A;
the apparatus includes:
  a controller configured to:
    for state A, enable a low impedance path for a dimmer current of the dimmer, wherein the impedance of the low impedance path is sufficiently low to maintain a stable phase angle of the dimmer;
    for state B:
      enable control of switch mode power conversion of the dimmer voltage;
      sense a leading edge of a dimmer input voltage; and
      after the sensing the leading edge of the dimmer input voltage, actively control a decreasing transition of a current through a triac-based dimmer to prevent a triac of the dimmer from prematurely resetting;
    for state C, control switch mode power conversion to maintain the dimmer current above a threshold; and
    for state D, enter an inactive state, wherein during the inactive state the low impedance path and the control of mode power conversion is disabled.

In an additional embodiment of the present invention, an apparatus includes a controller configured to sense a leading edge of a dimmer input voltage to a power converter system. The controller is further configured to control a dimmer current in accordance with a profile that transfers energy to a power converter system to damp an inductor-capacitor circuit in a dimmer.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
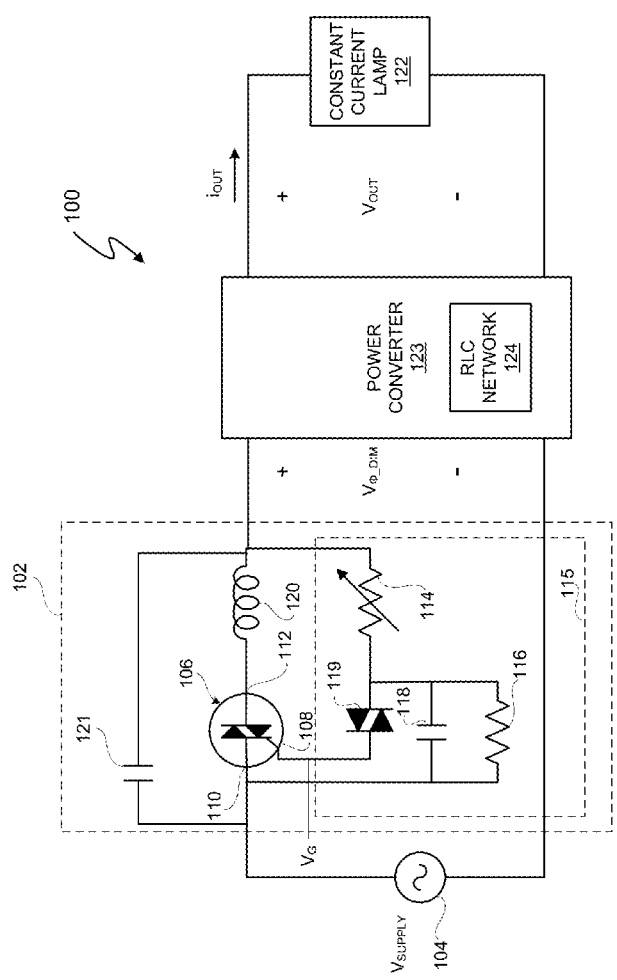
FIG. 1 (labeled prior art) depicts a lighting system that includes a leading edge dimmer.

In at least one embodiment, a system and method includes a controller that is configured to coordinate (i) a low impedance path for a dimmer current, (ii) attaching a dimmer to an interface of a power converter system at the leading edge of a phase-cut, rectified input voltage, (iii), control of switch mode power conversion, and (iv) an inactive state to, for example, reduce the dimmer current while allowing a dimmer to function normally from cycle to cycle of an alternating current (AC) supply voltage. In at least one embodiment, the dimmer functions normally when the dimmer conducts at a correct phase angle indicated by a dimmer input setting and avoids prematurely resetting while conducting. In at least one embodiment, by coordinating functions (i), (ii), (iii), and (iv), the controller controls a power converter system that is compatible with a triac-based dimmer. In at least one embodiment, the controller coordinates functions (i), (ii), (iii), and (iv) in response to a particular dimming level indicated by a phase cut, rectified input voltage supplied to the power converter system. In at least one embodiment, as the dimming level changes, the controller adjusts coordination of functions (i), (ii), (iii), and (iv) so that the power converter system provides a constant current to the load for each dimming level. In at least one embodiment, the system operating under control of the controller reduces resistor-based power losses while providing compatibility between the triac-based dimmer and a load receiving a constant current for a dimming level.

Additionally, in at least one embodiment, when a triac-based dimmer initially turns ON, i.e. conducts, during a cycle of a supply voltage, an inductor and capacitor in the triac-based dimmer form a resonant circuit. The resonant circuit can result in abrupt voltage and current changes at the input to the power converter system when the triac initially conducts. In at least one embodiment, if an input impedance presented to the triac-based dimmer by the power converter system is sufficiently high to prevent adequate damping of an LC resonant circuit in the triac-based dimmer, the current through the inductor of the triac-based dimmer will decrease below a "hold current" value. The "hold current" value is a threshold value associated with the triac of the triac-based dimmer. If the inductor current, which flows through the triac, decreases below the hold current value, the triac will prematurely reset, i.e. become non-conductive, during a cycle of a supply voltage. If the triac prematurely resets, the input voltage to the power converter system is disrupted, which can cause errors and disruptions to output power provided by a switching power converter. An exemplary error in the output power occurs when the output power does not accurately correlate with a dimming level.

In at least one embodiment, to prevent the triac-based dimmer from prematurely resetting, after sensing, such as detecting, the leading edge of the dimmer input voltage, a controller actively controls a decreasing transition of a triac current through the triac-based dimmer to prevent the triac of the dimmer from prematurely resetting. In at least one embodiment, the controller actively controls the decreasing transition of the triac current until a value of the triac current reaches a predetermined steady state value above the hold current value. The steady state value can be expressed in any number of ways such as a mean value or a root mean square ("RMS") value of the triac current or a peak value of the triac current.

In at least one embodiment, a dimmer generates a voltage that is rectified and provided to the power converter system as a dimmer output voltage. The dimmer output voltage includes four states. In at least one embodiment, the four states are sequential and non-overlapping, i.e. the four states occur one after another and do not overlap in time. In at least one embodiment, the dimmer output voltage to the power converter system includes four states that occur from:

A. an approximately zero volt crossing of the dimmer voltage of a dimmer until a phase cut, leading edge of the dimmer voltage;

B. an end of state A until a value of a dimmer current has reached a predetermined hold value;

C. an end of state B until energy transferred to a load is sufficient to meet at least one energy transfer parameter; and D. an end of state C until a beginning of state A.

Other embodiments of the dimmer output voltage can have, for example, additional states. The states in A, B, C, and D can be sub-divided into sub-states. Additionally, U.S. patent application Ser. No. 13/194,808, entitled "Coordinated Dimmer Compatibility Functions", inventors John L. Melanson and Eric J. King, and assignee Cirrus Logic, Inc., describes exemplary systems and methods related to states A, C, and D. U.S. patent application Ser. No. 13/194,808 is incorporated herein by reference in its entirety.

Given the four foregoing states, in at least one embodiment, the controller of the electronic system is configured to coordinate functions (i), (ii), (iii), and (iv) as follows:

for state A, enabling a low impedance path for a dimmer current of the dimmer, wherein the impedance of the low impedance path is sufficiently low to maintain a stable phase angle of the dimmer;

for state B:

enabling control of switch mode power conversion of the dimmer voltage;

sensing a leading edge of a dimmer input voltage; and after sensing the leading edge of the dimmer input voltage, actively controlling a decreasing transition of a current through a triac-based dimmer to prevent a triac of the dimmer from prematurely resetting;

for state C, controlling switch mode power conversion to maintain the dimmer current above a threshold; and for state D, entering an inactive state, wherein during the inactive state the low impedance path and the control of mode power conversion is disabled.

Figure 3:
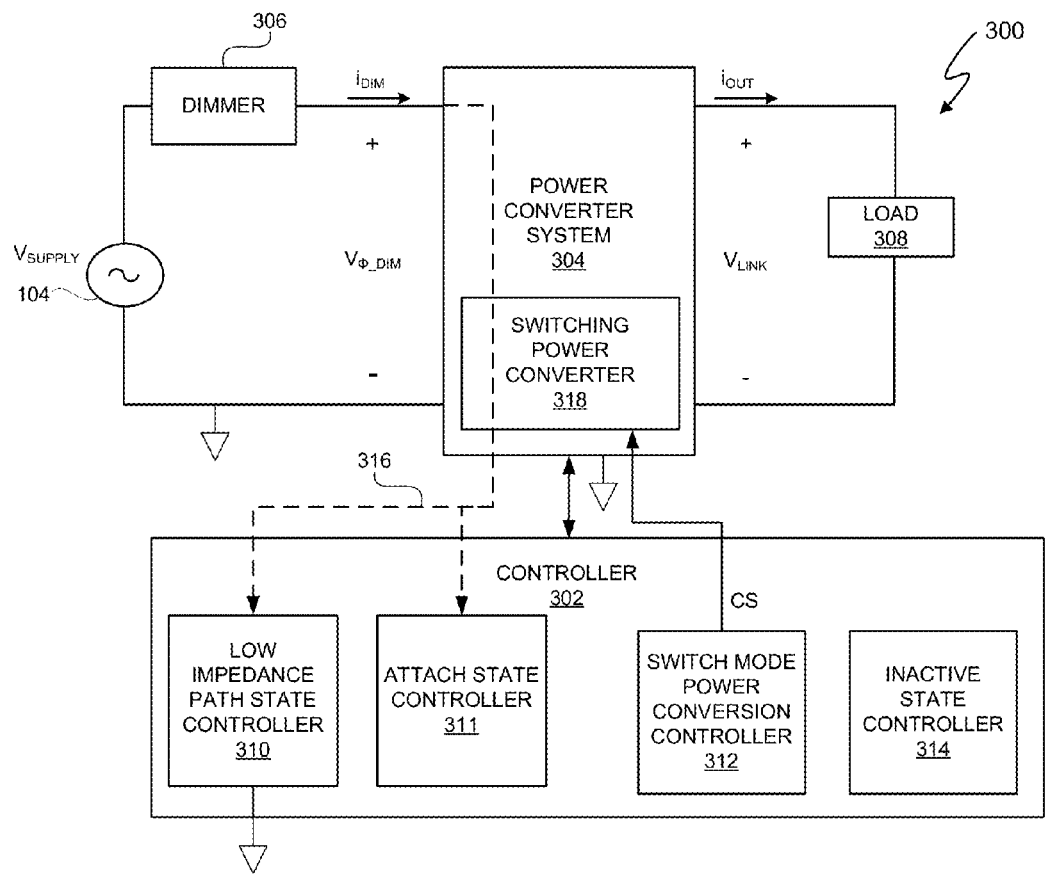
FIG. 3 depicts an electronic system that includes a controller to control a power converter system by coordinating the functions of a glue circuit, a dimmer emulator, and a switch mode power conversion controller.

FIG. 3 depicts an electronic system 300 that includes a controller 302 to control power converter system 304 by, for example, coordinating the functions of low impedance path state controller 310, an attach state controller 311, a switch mode power conversion controller 312, and inactive state controller 314 to provide compatibility between the dimmer 306 and the load 308 so that, for example, the dimmer 306 functions normally. In at least one embodiment, the power converter system 304 includes a switching power converter 318 that converts a dimmer voltage $V_{\phi\_DIM}$ from dimmer 306 into a regulated output voltage $V_{LINK}$. The dimmer voltage $V_{\phi\_DIM}$ is an input voltage to the power converter system 304. The power converter system 304 also provides a current $i_{OUT}$ for a load 308. The load 308 can be any load including a lamp that includes one or more light emitting diodes (LEDs). In at least one embodiment, the current $i_{OUT}$ is an approximately constant current for a dimming level of the dimmer 306. An "approximately constant current for a dimming level" means that for a particular dimming level, the current $i_{OUT}$ will have an approximately constant value. Dimmer 306 can be any type of dimmer, such as a triac-based dimmer identical to dimmer 102 of FIG. 1. In at least one embodiment, dimmer 306 is a "smart dimmer" that includes a triac-based, supply voltage phase cutting circuit. "Smart dimmers" refer to a class of dimmers that include a microprocessor to control various functions such as setting the dimmer level.

In at least one embodiment, the controller 302 supports a normal operation of the dimmer 306 by restraining the dimmer 306 from prematurely resetting and supporting a stable phase angle cut for a given dimming level to prevent phase cutting at a wrong phase angle for a set dimming level. In at least one embodiment, the controller 302 also provides a constant output current $i_{OUT}$ corresponding to a dimmer level set by dimmer 306. A "wrong" phase angle is an error such as a phase angle that differs from a phase angle set by the timer 115, which can occur if, for example, capacitor 121 (FIG. 1) prematurely discharges. For loads, such as one or more light emitting diodes, that utilize a small output current $i_{OUT}$, especially at low dimming levels, the output current $i_{OUT}$ utilized by the loads can be insufficient to support a normal operation of a triac-based dimmer 306.

In at least one embodiment, the controller 302 enables the low impedance path state controller 310 to provide a low impedance current path 316 to the dimmer 306 from an approximately zero volt crossing of the dimmer voltage $V_{\phi\_DIM}$ of the dimmer 306 until a phase cut, leading edge of the dimmer voltage $V_{\phi\_R}$. As subsequently described with reference to FIG. 6A, the zero crossing of the dimmer voltage $V_{\phi\_R}$ occurs at an end of each cycle of the dimmer voltage $V_{\phi\_R}$ when the dimmer voltage $V_{\phi\_R}$ approximately reaches 0V. In at least one embodiment, the dimmer voltage $V_{\phi\_R}$ approximately reaches 0V when the dimmer voltage $V_{\phi\_R}$ has a voltage value less than or equal to 0+a zero crossing voltage threshold $V_{ZC\_TH}$. The particular value of the zero crossing voltage threshold is a matter of design choice and, in at least one embodiment, is 5V. The particular impedance value of current path 316 is a matter of design choice. In at least one embodiment, the impedance value of current path 316 is sufficiently low to allow a sufficient dimmer current $i_{DIM}$ to flow through dimmer 306 to provide a stable phase angle for dimmer 306, i.e. prevent the dimmer 306 from firing at the wrong phase angle. In at least one embodiment, enabling the low impedance path 316 at the zero crossing of the dimmer voltage $V_{\phi\_R}$ supports consistent timing for the phase angle cutting by the dimmer 306 for a given dimming level. Thus, the phase angle cut by the dimmer 306 for a given dimming level remains consistent. In at least one embodiment, providing the low impedance current path 316 to dimmer 306 prevents the dimmer current $i_{DIM}$ from decreasing below a holding current (HC) value of a triac-based dimmer 306.

At an end of the phase cut of supply voltage $V_{SUPPLY}$, controller 302 disables the glue circuit 704 (FIG. 7), and the glue circuit 704 releases the low impedance current path 316, i.e. low impedance current path 316 is disabled or placed in a high impedance state to substantially prevent current flow through current path 316.

Figure 7:
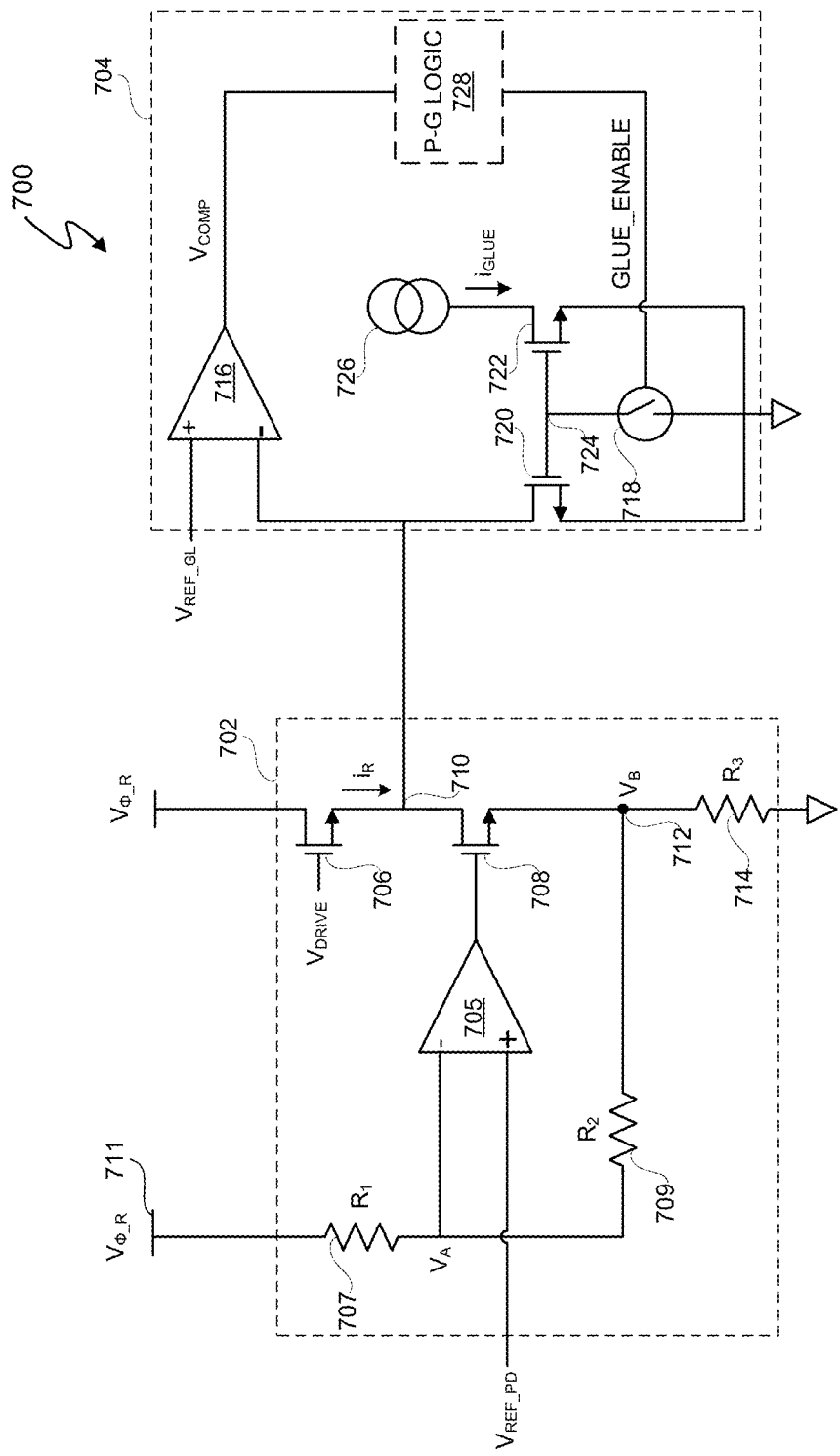
FIG. 7 depicts an embodiment of an inactive state controller of the electronic system of FIG. 4.
Figure 8A:
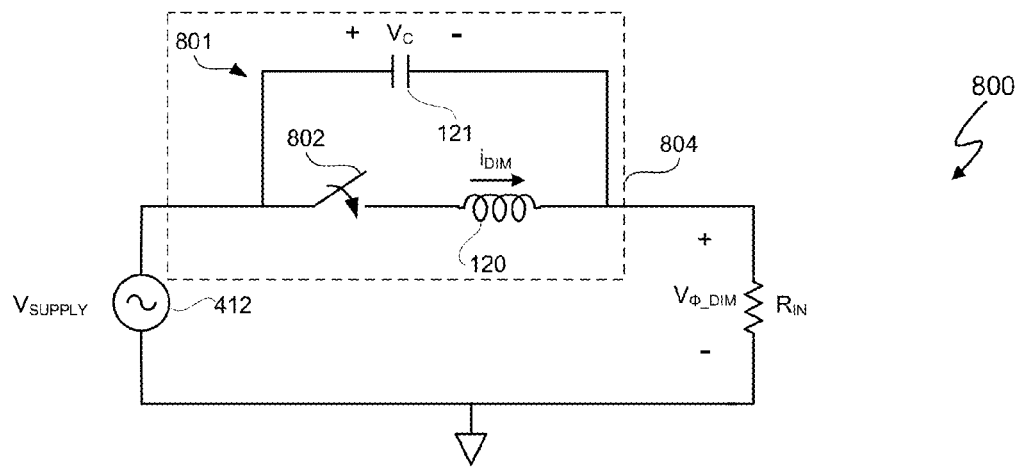
FIG. 8A depicts an electronic system that is equivalent to an embodiment of the electronic system of FIG. 3 without an attach state controller.
Figure 8B:
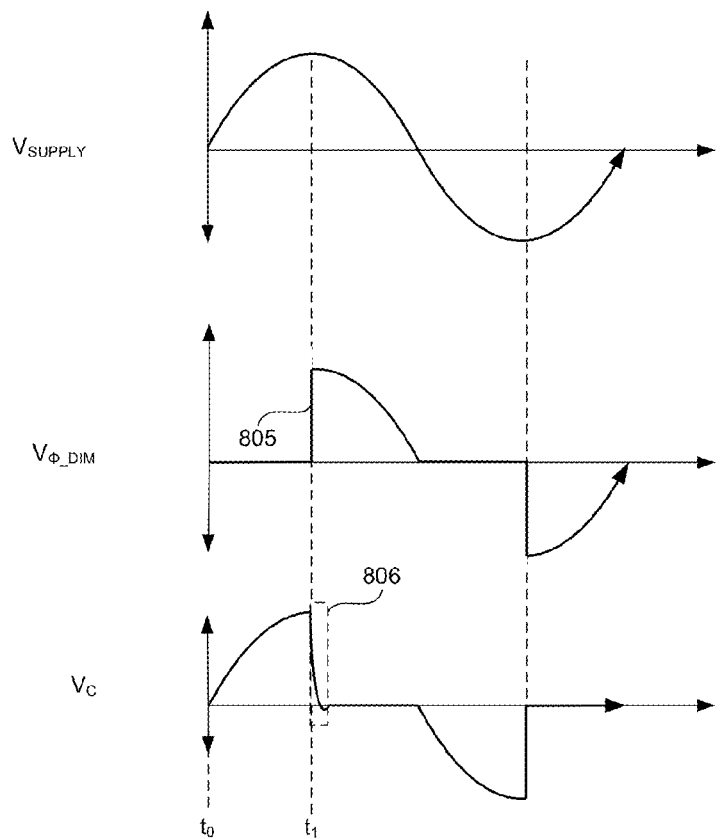
FIGS. 8B and 8C depict exemplary associated waveforms associated with the electronic system of FIG. 8A.
Figure 8C:
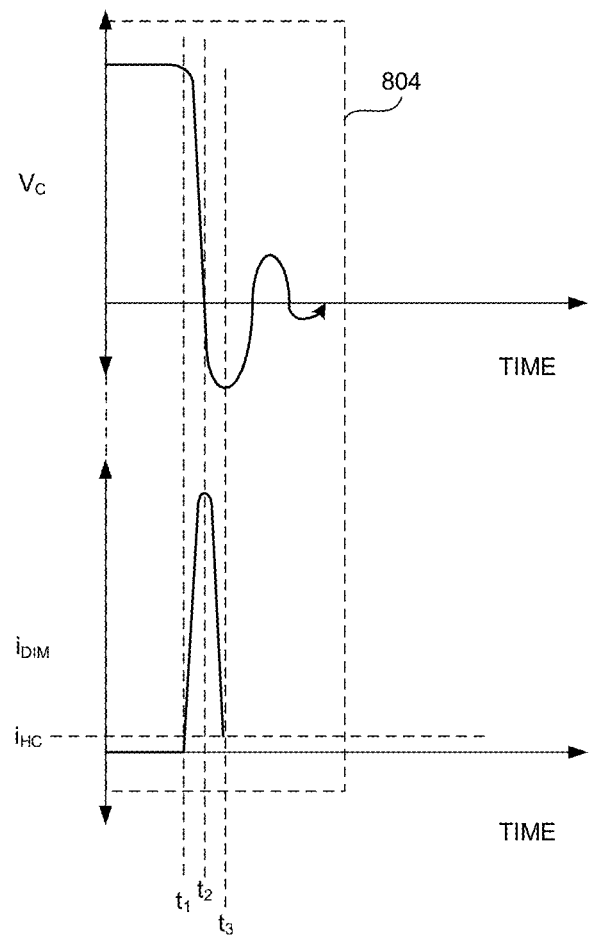
Figure 13:
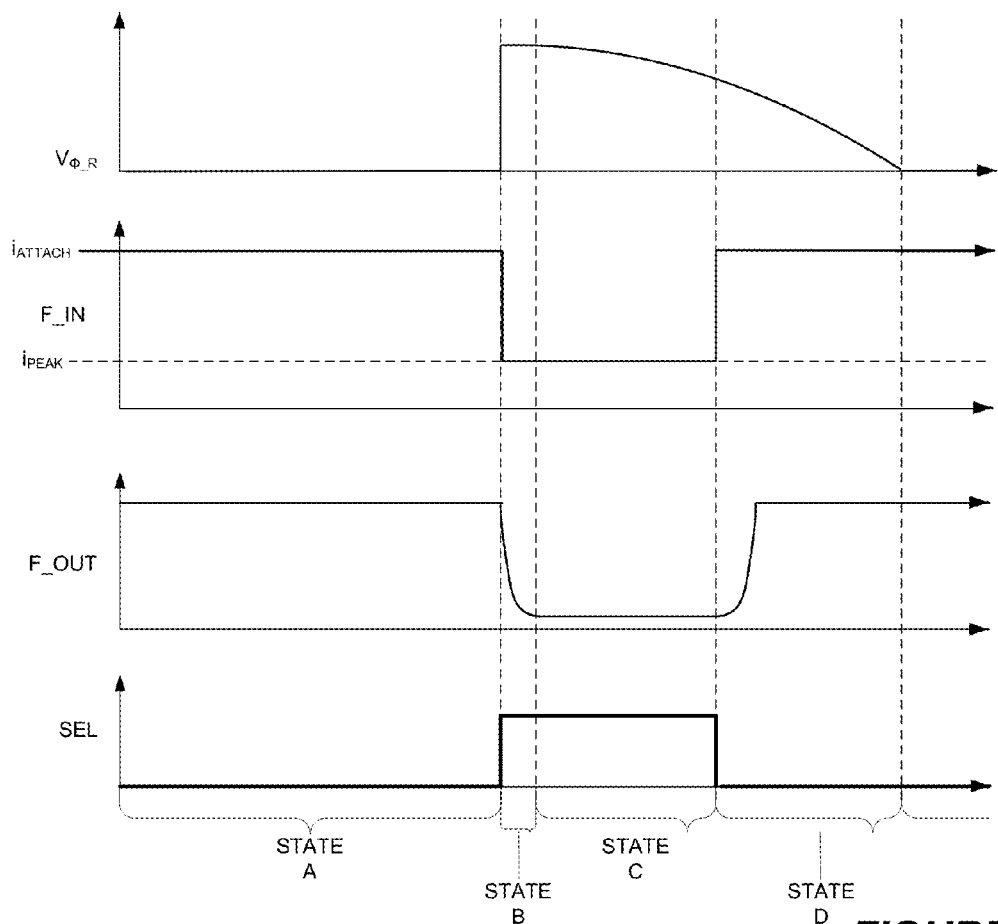
FIG. 13 depicts exemplary waveforms associated with the current controller of FIG. 12.

FIG. 8A depicts an electronic system 800 that is equivalent to an embodiment of the electronic system 300 without an attach state controller 311. An attach state begins at a leading edge of the dimmer input voltage $V_{\phi\_DIM}$ and occurs during an initial charge transfer period of the leading edge of a triac-based dimmer 306. (FIGS. 6 and 13 depict exemplary attach states identified at STATE B). FIGS. 8B and 8C depict exemplary associated waveforms associated with the electronic system 800. Referring to FIGS. 8A, 8B, and 8C, from time to until time the triac 802 is not conducting. The triac 802 is represented schematically as a simple switch in this illustration. While triac 802 is not conducting, the voltage $V_C$ across capacitor 121 tracks the supply voltage $V_{SUPPLY}$, and the current $i_{DIM}$ through the triac 802 and the inductor 120 is 0A. Without the attach state B, when the glue circuit 302 704 (FIG. 7) disengages, the power converter system 304 can present a large enough input impedance RN that inadequately damps an LC resonant circuit formed by the capacitor 121 and inductor 120.

Thus, when the switch 802 closes at time $t_1$ and conducts, the capacitor 121 and inductor 120 form an LC circuit 806 that will resonate unless damped with a sufficiently high input impedance $R_{IN}$. FIGS. 8B and 8C depict a time window 806. At a leading edge 805 of the dimmer voltage $V_{\phi\_DIM}$, the capacitor voltage $V_C$ abruptly falls. If the phase cut angle of supply voltage $V_{SUPPLY}$ is 90°, the supply voltage $V_{SUPPLY}$ and the capacitor voltage $V_C$ are at a peak value. For a 220V RMS supply voltage, the peak value of $V_{SUPPLY}$ and the capacitor voltage $V_C$ at a 90° phase cut angle is approximately +350V. The inductor current $i_{DIM}$ increases until the capacitor voltage $V_C$ decreases to a zero crossing at time $t_2$ and transitions to a negative voltage. The capacitor voltage $V_C$ continues to decrease between times $t_2$ and $t_3$ to approximately −10V--30V. Then at time $t_3$, as the capacitor voltage $V_C$ begins to rise, the inductor current $i_{DIM}$ reaches the hold current value $i_{HC}$ at about the same time that the capacitor voltage $V_C$ reaches 0V. When the inductor current $i_{DIM}$ goes below the hold current value $i_{HC}$, the triac 802 resets prematurely. For a typical capacitance value of 22 nF for capacitor 120 and a typical inductance value of 1 mH for inductor 120, the time between times $t_1$ and $t_3$ is approximately 50 μsec. A quarter period of a 50 Hz supply voltage $V_{SUPPLY}$ is 5 msec. Thus, after 50 μsec, the supply voltage $V_{SUPPLY}$ will be just past a 90° phase angle. However, when the inductor current $i_{DIM}$ falls below the hold current $i_{HC}$ for triac 802, the triac 802 will prematurely reset and, thus, stop conducting. An exemplary value of the hold current $i_{HC}$ is 50 mA.

Referring to FIGS. 3 and 8, to prevent the dimmer 306 from prematurely resetting, at the end of the phase cut of the dimmer voltage $V_{DIM}$, the controller 302 enables the attach state controller 311. The attach state controller 311 actively controls a decreasing transition of the dimmer current $i_{DIM}$ through a triac of dimmer 306 to dampen the resonance of the LC circuit 804. In at least one embodiment, the attach state controller 311 actively controls the dimmer current $i_{DIM}$ to dampen the resonance of the LC circuit 804 so that a steady state value, such as an RMS value, a mean value, or a peak value, of the dimmer current $i_{DIM}$ through the triac 802 and inductor 120 remains above the hold current value $i_{HC}$ and reaches a predetermined steady state current value Referring to FIG. 3, when the average dimmer current $i_{DIM}$ reaches the steady state current value, controller 302 enables the switch mode power conversion controller 312, and the switch mode power conversion controller 312 generates a control signal CS to control power conversion by the power converter system 304. In at least one embodiment, the controller 302 senses the link voltage $V_{LINK}$, and, when the link voltage $V_{LINK}$ is greater than a link voltage threshold value, the controller 302 disables the switch mode power conversion controller 312. The particular value of the link voltage threshold is a matter of design choice. In at least one embodiment, the link voltage threshold value is set so that the link voltage $V_{LINK}$ can be maintained at an approximately DC value. In at least one embodiment, the switch mode power conversion controller 312 maintains the dimmer current $i_{DIM}$ at a level so that the dimmer 306 remains in a conductive state from an occurrence of a phase cut, leading edge of the dimmer voltage $V_{\phi\_R}$ until energy transferred to the load 308 is sufficient to meet at least one energy transfer parameter, such as the link voltage $V_{LINK}$ is above a target link voltage $V_{LINK\_TARGET}$ and dimmer 306 has been in a conductive state until a zero crossing of the supply voltage $V_{SUPPLY}$ so that the dimmer 306 does not prematurely reset. A premature reset can also cause instability in phase cutting by dimmer 306 and, thus, cause the dimmer 306 to cut the supply voltage $V_{SUPPLY}$ at a wrong phase angle.

In at least one embodiment, when the controller 302 disables the switch mode power conversion controller 312, the controller 302 enables the inactive state controller 314. In at least one embodiment, the inactive state controller 314 causes the dimmer current $i_{DIM}$ to drop to approximately 0 A and determines a zero crossing of the dimmer voltage $V_{\phi\_R}$. In at least one embodiment, the inactive state controller 314 determines the zero crossing so that the low impedance path state controller 310 can enable the low impedance path 316 at the zero crossing and support stable phase cutting angles by the dimmer 306 so that the dimmer 306 remains stable for a given dimming level. In at least one embodiment, the inactive state controller 314 generates an emulated dimmer voltage $V_{\phi\_DIM}$ to, for example, determine a zero crossing of the dimmer voltage $V_{\phi\_R}$. In at least one embodiment, the inactive state controller 314 generates the emulated dimmer voltage by enabling the current path 316 to discharge a current that is inversely proportional to the dimmer voltage $V_{\phi\_DIM}$. In at least one embodiment, the inactive state controller 314 shapes the discharged current so that the emulated dimmer voltage approximates an actual dimmer voltage $V_{\phi\_DIM}$. The term "determine" and derivatives thereof contemplates analytical determination, detection by observation, or a combination of analytical determination and detection by observation.

Figure 4:
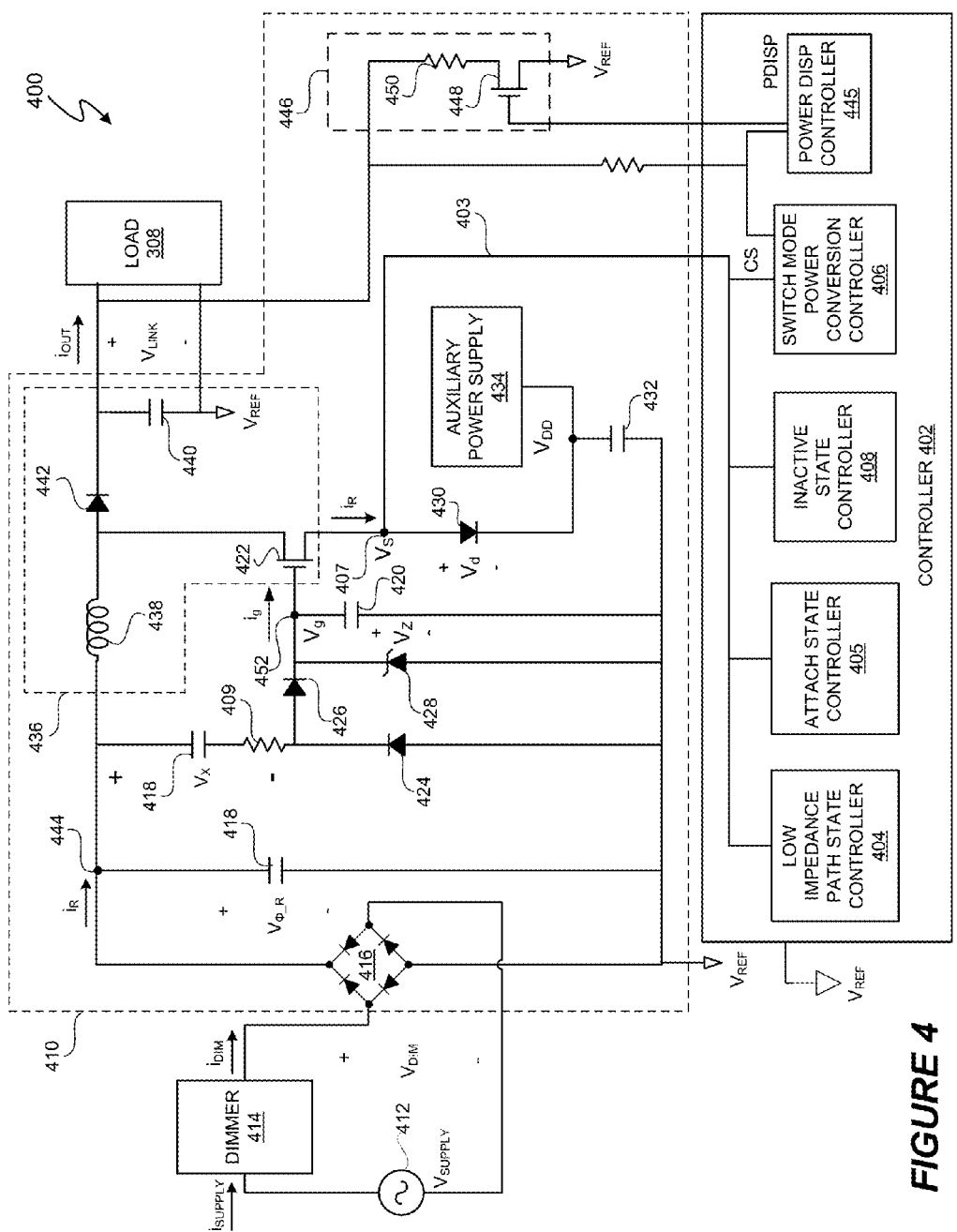
FIG. 4 depicts an electronic system that represents one embodiment of the electronic system of FIG. 3.

FIG. 4 depicts an electronic system 400, which represents one embodiment of electronic system 300. Electronic system 400 includes controller 402, and controller 402 includes low impedance path state controller 404, attach state controller 405, switch mode power conversion controller 406, and inactive state controller 408. The controller 402 coordinates the low impedance path state controller 404, attach state controller 405, switch mode power conversion controller 406, and inactive state controller 408. Controller 402 represents one embodiment of the controller 302. The low impedance path state controller 404 represents one embodiment of the low impedance path state controller 310. The attach state controller 405 represents one embodiment of the attach state controller 311. The switch mode power conversion controller 406 represents one embodiment of the switch mode power conversion controller 312, and the inactive state controller 408 represents one embodiment of the inactive state controller 314.

Electronic system 400 includes a power converter system 410 to convert the dimmer voltage $V_{\phi\_DIM}$ into a regulated, approximately DC output voltage $V_{LINK}$ for load 308. Voltage source 412 supplies an alternating current (AC) input voltage $V_{SUPPLY}$ through the series connected, triac-based dimmer 414 to a full bridge diode rectifier 416. In at least one embodiment, dimmer 414 is identical to dimmer 306 (FIG. 3). The voltage source 412 is, for example, a public utility, and the AC supply voltage $V_{SUPPLY}$ is, for example, a 60 Hz/110 V line voltage in the United States of America or a 50 Hz/220 V line voltage in Europe. The dimmer 414 provides a dimmer voltage $V_{DIM}$. In at least one embodiment, the dimmer 414 is a leading edge dimmer, and the dimmer voltage $V_{\phi\_DIM}$ has a leading phase cut when the dimmer 414 generates a dimming level between approximately 0 and 100%. The full bridge rectifier 416 supplies a rectified AC dimmer voltage $V_{\phi\_R}$ to the power converter system 410. Thus, the dimmer voltage $V_{\phi\_R}$ represents a rectified version of the dimmer voltage $V_{\phi\_DIM}$.

Capacitor 418 filters high frequency components from rectified dimmer voltage $V_{\phi\_R}$. Capacitors 418 and 420 establish a voltage divider to set a gate bias voltage $V_g$ at node 452 for the source follower field effect transistor (FET) 422. Resistor 409 reduces peak currents through diode 426. In at least one embodiment, the particular capacitance values of capacitors 418 and 420 are a matter of design choice. In at least one embodiment, the capacitance of capacitor 418 is 22-47 nF, and the capacitance of capacitor 420 is 47 nF. Diode 424 prevents the gate current $i_g$ from being conducted to the voltage reference $V_{REF}$, such as a ground reference. The gate current $i_g$ is conducted through diode 426, which prevents reverse current flow of the gate current $i_g$, to the gate of source follower FET 422. Zener diode 428 clamps the gate of source follower FET 422 to the gate voltage $V_g$.

The gate bias voltage $V_g$ minus the source voltage $V_S$ of FET 422 exceeds a threshold voltage of FET 422. During start-up of power converter system 410, FET 422 conducts current $i_R$ through diode 430 to charge capacitor 432 to the operating voltage $V_{DD}$. In at least one embodiment, after start-up, an auxiliary power supply 434 provides an operational voltage $V_{DD}$ for controller 402. An exemplary auxiliary power supply 434 is described in U.S. patent application Ser. No. 13/077,421, filed on Mar. 31, 2011, entitled "Multiple Power Sources for a Switching Power Converter Controller", inventors John L. Melanson and Eric J. King, assignee Cirrus Logic, Inc. (referred to herein as "Melanson I"). Melanson I is hereby incorporated by reference in their entireties.

The capacitance of capacitor 432 is, for example, 10 μF. At start-up, the operating voltage $V_{DD}$ across capacitor 432 equals the Zener voltage $V_Z$ minus the threshold voltage $V_{T422}$ of FET 422 minus the diode voltage $V_d$ across diode 430, i.e. at start-up $V_{DD}=V_Z-V_{T422}-V_d$. FET 422 is a high voltage FET that is also used to control boost-type switching power converter 436, and the threshold voltage $V_{T422}$ of FET 422 is, for example, approximately 3V.

The power converter system 410 also includes an optional power dissipation circuit 446 to dissipate excess power from the power converter system 410. The sudden rise of a leading edge of the dimmer input voltage $V_{\phi\_DIM}$ a dimmer current $i_{DIM}$ to the power converter system 410 in excess of the current needed to maintain the link voltage $V_{LINK}$ for the load 308. To dissipate the excess current, the power dissipation controller 445 generates a power dissipation control signal PDISP to turn the FET 448 ON until the power dissipation circuit dissipates excess current through resistor 450 and FET 448.

Figure 5:
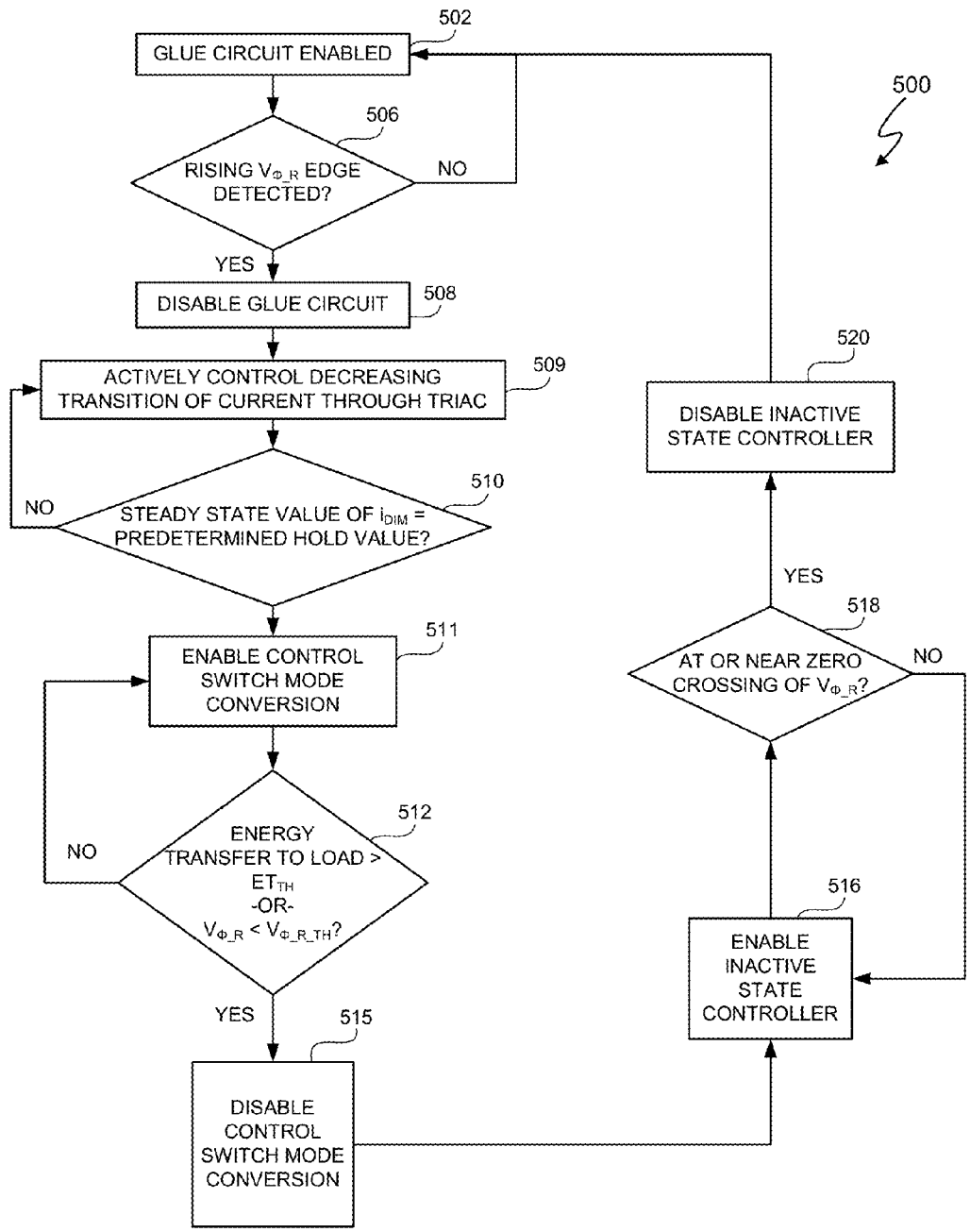
FIG. 5 depicts a controller function coordination process for the electronic system of FIG. 4.
Figure 6A:
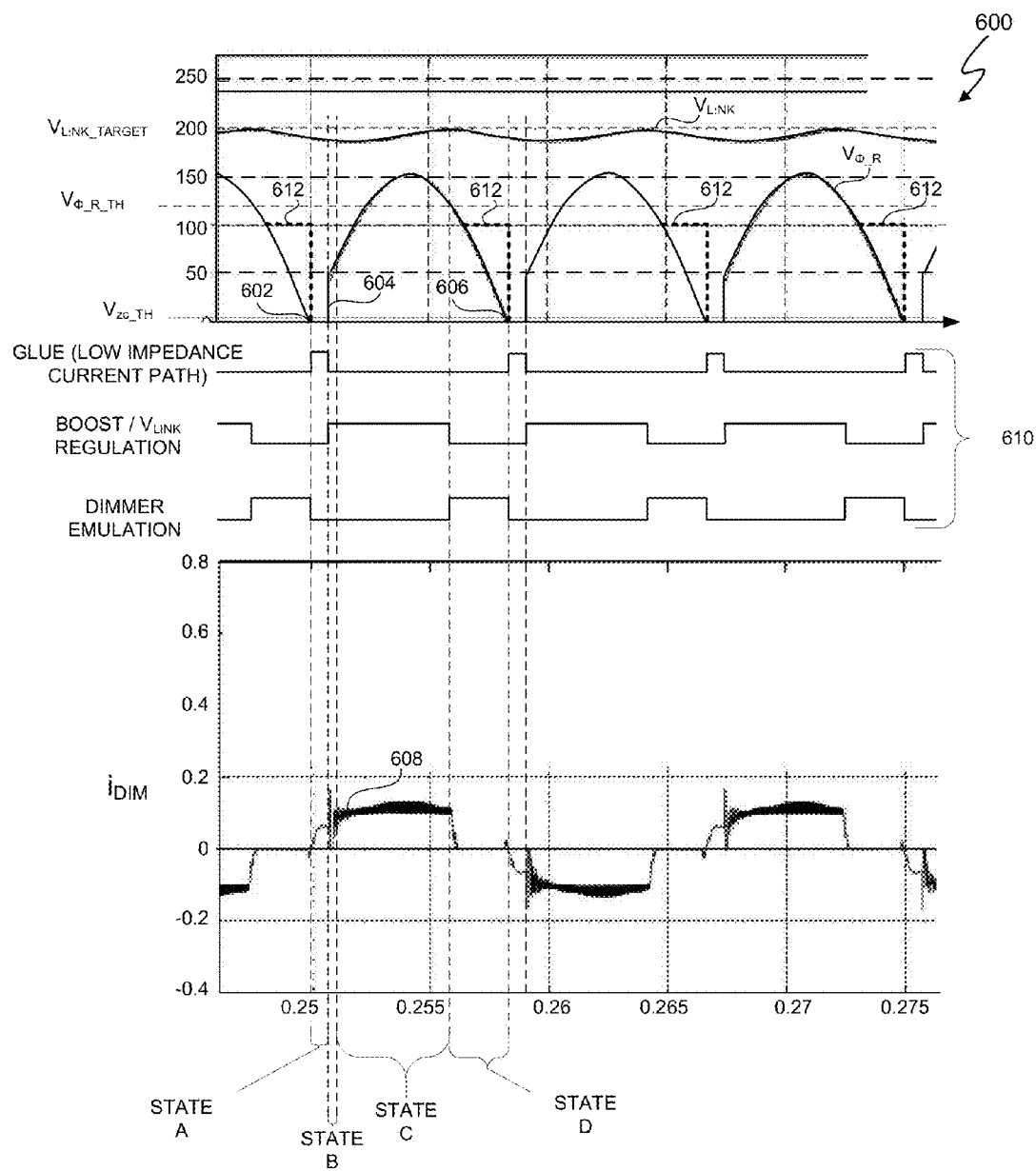
FIG. 6A depicts exemplary signals in the electronic system of FIG. 4 when utilizing the controller function coordination process of FIG. 5.

FIG. 5 depicts a controller function coordination process 500 that represents one embodiment of a process used by controller 402 (FIG. 4) to coordinate the functions of the low impedance path state controller 404, the attach state controller 405, the switch mode power conversion controller 406, and the inactive state controller 408 and thereby provide compatibility between dimmer 414 and load 308. FIG. 6A depicts exemplary signals and states of the dimmer voltage $V_{\phi\_R}$ and dimmer current $i_{DIM}$ in the electronic system 400 when controller 402 utilizes the controller function coordination process 500. In at least one embodiment, controller 402 includes a memory (not shown) that includes code that implements one or more operations of controller function coordination process 500. In at least one embodiment, controller 402 also includes a processor (not shown) that is connected to the memory and executes the code and, thus, the operations of the controller function coordination process 500. In at least one embodiment, the controller function coordination process 500 is implemented using any combination of analog, digital, analog and digital, and/or microprocessor components. The particular implementation is a matter of design choice. In at least one embodiment, controller function coordination process 500 is implemented as a state machine operable by controller 402.

Referring to FIGS. 4, 5, and 6, in at least one embodiment, the controller function coordination process 500 initiates at the beginning of state A at an initial zero crossing of the dimmer voltage $V_{\phi\_R}$. In at least one embodiment, the controller 402 begins operation 502 at approximately each zero-crossing of the rectified dimmer voltage $V_{\phi\_R}$, such as within 0-5V of each zero crossing. Operation 502 enables low impedance path state controller 404. When the low impedance path state controller 404 is enabled, FET 422 conducts, and the drain-to-source impedance of FET 422 is very low, e.g. a few ohms. Additionally, the frequency of the rectified input current $i_R$ is low so that the impedance of inductor 438 is low. Thus, the overall impedance of the low impedance path for current $i_{DIM}$ is a few ohms, such as between 0 and 100 ohms.

In at least one embodiment, for a new cycle of the rectified input voltage $V_{\phi\_R}$, operation 502 begins at the zero crossing 602, which is the beginning of state A. When operation 502 begins, the rectified input voltage $V_{\phi\_R}$ is less than the operating voltage $V_{DD}$ plus the forward bias voltage of diode 430. Thus, the diode 430 is reversed biased, and the source voltage $V_S$ at source node 407 is approximately equal to the rectified dimmer voltage $V_{\phi\_R}$ at node 444. The enabled low impedance path state controller 404 keeps the source voltage $V_S$ at approximately 0V and creates a low impedance current path 403 through inductor 438 and FET 422 for the rectified input current $i_R$ to flow. Thus, the supply current $i_{SUPPLY}$ is non-zero as indicated by the non-zero dimmer current $i_{DIM}$ during state A. Thus, the supply current $i_{SUPPLY}$ continues to flow to the dimmer 414 during operation 502 to, in at least one embodiment, stabilize the cycle-to-cycle phase cutting angle by dimmer 414 for a given dimming level.

While the low impedance path state controller 404 is enabled in operation 502, controller function coordination process 500 performs operation 506. Operation 506 determines whether the low impedance path state controller 404 has detected a leading edge, such as leading edge 604, of the rectified dimmer voltage $V_{\phi\_R}$. If a rising edge of the rectified input voltage $V_{\phi\_R}$ has not been detected, then the dimmer 414 is still phase cutting the supply voltage $V_{SUPPLY}$ and no voltage is available to boost the link voltage $V_{LINK}$. So, operation 502 continues to enable the low impedance path state controller 404. An exemplary system and method for detecting a phase cut including detecting the leading edges of the rectified dimmer voltage $V_{\phi\_R}$ is described in U.S. patent application Ser. No. 12/858,164, filed on Aug. 17, 2010, entitled Dimmer Output Emulation, inventor John L. Melanson, and assignee Cirrus Logic, Inc., which is referred to herein as "Melanson I" and incorporated by reference in its entirety. Another exemplary system and method for detecting the leading edges of the rectified dimmer voltage $V_{\phi\_R}$ is described in U.S. patent application Ser. No. 13/077,483, filed on Mar. 31, 2011, entitled Dimmer Detection, inventors Robert T. Grisamore, Firas S. Azrai, Mohit Sood, John L. Melanson, and Eric J. King and assignee Cirrus Logic, Inc., which is referred to herein as Grisamore I and also incorporated by reference in its entirety.

If a leading edge of the dimmer voltage $V_{\phi\_R}$ is detected, then operation 508 disables the low impedance path state controller 404. When the leading edge of the dimmer voltage $V_{\phi\_R}$ is detected, state A ends and state B begins. At the beginning of state B, operation 509 enables the attach state controller 405. In operation 509, the attach state controller 405 actively controls a decreasing transition of the dimmer current $i_{DIM}$ to prevent a triac of dimmer 414 from prematurely resetting. Actively controlling the dimmer current $i_{DIM}$ dampens the LC resonant circuit of the triac. Thus, in at least one embodiment, the attach state controller 405 actively controls the input resistance of the power converter system 410 during state B. "Actively control" is used in contrast to "passive control". "Passive control" occurs when a circuit, such as a resistor, is used and the characteristics, such as the resistance, of the circuit are not under control of a controller.

Operation 509 continues until operation 510 determines that a steady state value, such as a mean value, an RMS value, or a peak value, of the dimmer current $i_{DIM}$ equals a predetermined hold value. In at least one embodiment, the steady state mean value and RMS value of the dimmer current $i_{DIM}$ are approximately equal to but greater than a hold current value of a triac to prevent the triac from prematurely resetting. In at least one embodiment, the steady state peak value of the dimmer current $i_{DIM}$ is greater than the hold current value of the triac. Once the dimmer current $i_{DIM}$ reaches the predetermined hold value, the dimmer current $i_{DIM}$ can be maintained by the switch mode power conversion controller 406 without the triac of the dimmer 414 prematurely resetting.

The particular process of actively controlling a decreasing transition of the dimmer current $i_{DIM}$ through the dimmer 414 to prevent a triac of the dimmer 414 from prematurely resetting is a matter of design choice. In at least one embodiment, the attach state controller 405 operates the power converter system in continuous conduction mode ("CCM") until the dimmer current $i_{DIM}$ reaches the steady state hold value. In CCM, the flyback time of the inductor 438 ends before the current $i_R$ in the inductor 438 drops to zero. In at least one embodiment, the attach state controller 405 actively controls a decreasing transition of the dimmer current $i_{DIM}$ by controlling a source current $i_R$ through FET 422. In at least one embodiment, the attach state controller 405 actively controls the source current $i_R$ using a variable impedance, such as a controllable digital-to-analog converter ("DAC"). The particular "decreasing transition" shape of the dimmer current $i_{DIM}$ is a matter of design choice. In at least one embodiment, the decreasing transition is a smooth, parabolic-type shape that effectively dampens the L-C circuit of the triac of dimmer 414. In at least one embodiment, the attach state controller 405 actively controls a gate voltage $V_g$ of FET 422 to control the decreasing transition of the dimmer current $i_{DIM}$. In at least one embodiment, parameters that control the decreasing transition of the dimmer current $i_{DIM}$ are programmable into controller 402 and accessible by the attach state controller 405. Exemplary parameters are filter coefficients for a low pass filter. In at least one embodiment, the attach state controller 405 operates the power converter system in continuous conduction mode ("CCM") until the dimmer current $i_{DIM}$ reaches the steady state hold value.

Once operation 510 determines that the dimmer current $i_{DIM}$ has reached a steady state value, controller 402 begins operating in state C. In state C, operation 511 enables the switch mode power conversion controller 406. The switch mode power conversion controller 406 controls switching power converter 436 by generating the switch control signal CS to regulate the link voltage $V_{LINK}$ as, for example, described in U.S. patent application Ser. No. 12/496,457, filed on Jun. 30, 2009, entitled Cascode Configured Switching Using At Least One Low Breakdown Voltage Internal, Integrated Circuit Switch To Control At Least One High Breakdown Voltage External Switch, inventor John L. Melanson, and assignee Cirrus Logic, Inc., which is hereby incorporated by reference in its entirety. In at least one embodiment, the switch mode power conversion controller 406 operates the switching power converter 436 in critical conduction mode (CRM) during state C. In CRM, the flyback time of the inductor 438 ends when the inductor current $i_R$ equals zero. In CRM, when the inductor current $i_R$ equals 0, the switch mode power conversion controller 406 generates switch control signal CS to cause FET 422 to conduct, the input current $i_R$ energizes inductor 438 to increase the voltage across inductor 438. When switch mode power conversion controller 406 generates switch control signal CS to cause FET 422 to stop conducting, the input current $i_R$ boosts the voltage across the link voltage across link capacitor 440. Diode 442 prevents current flow from link capacitor 440 into inductor 438 or FET 422. During operation 511, the dimmer current $i_{DIM}$ is approximately constant as indicated, for example, by the dimmer current $i_{DIM}$ at 608.

While the switch mode power conversion controller 406 is enabled in operation 511, operation 512 determines if the energy transferred to the load 308 is greater than an energy transfer parameter $ET_{TH}$ or the dimmer voltage $V_{\phi\_R}$ is less than a dimmer threshold voltage $V_{\phi\_R\_TH}$. In at least one embodiment, operation 512 determines if the energy transferred from the dimmer 414 is greater than an energy transfer parameter $ET_{TH}$ by determining an amount of time since the beginning of state C. If the time exceeds a particular threshold, then the dimmer 414 has transferred a sufficient amount of energy to the power converter system 410. In at least one embodiment, the amount of time is sufficient to allow capacitor 121 (FIG. 1) to discharge so that the dimmer 414 operates consistently from cycle to cycle of dimmer voltage $V_{\phi\_R}$. An exemplary amount of time is 100-300 μsecs. In at least one embodiment, the energy parameter $ET_{TH}$ is a target link voltage $V_{LINK\_TARGET}$. In this embodiment, operation 512 determines if the energy transferred from the dimmer 414 is greater than an energy transfer parameter $ET_{TH}$ by determining if the link voltage $V_{LINK}$ is greater than the target link voltage $V_{LINK\_TARGET}$, then the link capacitor 440 has been sufficiently boosted. If the link voltage $V_{LINK}$ is not greater than the target link voltage $V_{LINK\_TARGET}$, the link voltage $V_{LINK}$ should be further boosted if the dimmer voltage $V_{\phi\_R}$ is greater than a rectified dimmer threshold voltage $V_{\phi\_R\_TH}$. In at least one embodiment, if the dimmer voltage $V_{\phi\_R}$ is less than a dimmer threshold voltage $V_{\phi\_R\_TH}$, the dimmer voltage $V_{\phi\_R}$ is too low to efficiently transfer energy to the load 308 from the voltage supply 412.

Thus, if sufficient energy has not been transferred to the load 308 or the rectified dimmer voltage $V_{\phi\_R}$ is greater than the rectified dimmer threshold voltage $V_{\phi\_R\_TH}$, then operation 511 continues to enable the switch mode power conversion controller 406 and, thus, continues to boost the link voltage $V_{LINK}$.

In operation 512, if sufficient energy has been transferred to the load 308 or the rectified dimmer voltage $V_{\phi\_R}$ is less than the rectified dimmer threshold voltage $V_{\phi\_R\_TH}$, then operation 515 causes the switch mode power conversion controller 406 to stop boosting the link voltage $V_{LINK}$, state C ends, state D begins, and operation 516 enables the inactive state controller 408. The "inactive" state controller 408 is not itself inactive. In at least one embodiment, the inactive state controller 408 causes the dimmer current $i_{DIM}$ to drop to approximately 0 A and determines zero crossings and leading edges of the dimmer voltage $V_{\phi\_R}$.

The rectified dimmer current $i_R$ is inversely proportional to the rectified dimmer voltage $V_{\phi\_R}$. During state D when the inactive state controller 408 is enabled, the inactive state controller 408 controls the flow of the rectified dimmer current $i_R$ so that the voltage at node 444 emulates the actual rectified dimmer voltage $V_{\phi\_R}$ for a part of the cycle of the rectified dimmer voltage $V_{\phi\_R}$ that occurs when the link voltage $V_{LINK}$ is less than the target link voltage $V_{LINK\_TARGET}$ and after a detection of a leading edge of the rectified dimmer voltage $V_{\phi\_R}$. While the inactive state controller 408 emulates the rectified dimmer voltage $V_{\phi\_R}$, the inactive state controller 408 effectively isolates the power converter system 410 from the dimmer 414, and the emulated dimmer output voltage $V_{\phi\_R}$ allows the power converter system 410 and load 308 to function in a normal mode that is equivalent to when the dimmer 414 ideally continues to conduct until the supply voltage $V_{SUPPLY}$ reaches approximately 0V. An exemplary inactive state controller 408 using analog circuitry is described in conjunction with FIG. 7 and in Melanson I. In at least one embodiment, the rectified dimmer voltage $V_{\phi\_R}$ is synthesized digitally by the inactive state controller 304 as, for example, described in Melanson II. As indicated by the dashed lines, the rectified dimmer voltage $V_{\phi\_R}$ is peak rectified to approximately the dimmer threshold voltage $V_{\phi\_R\_TH}$ until the end of the rectified input voltage cycle $V_{\phi\_R}$. For the digital embodiment of the inactive state controller, at the end of the rectified input voltage cycle $V_{\phi\_R}$, the rectified dimmer voltage $V_{\phi\_R}$ is decreased to 0V.

Operation 518 determines whether the rectified input voltage $V_{\phi\_R}$ is at or near the next zero crossing, such as zero crossing 606. If the rectified input voltage $V_{\phi\_R}$ is not at or near the next zero crossing, the inactive state controller 408 continues to generate the emulated dimmer voltage $V_{\phi\_R}$. If the rectified input voltage $V_{\phi\_R}$ is at or near the next zero crossing, operation 520 disables the inactive state controller 408, and controller function coordination process 500 returns to operation 502 and repeats.

The enable/disable states 610 depict when the low impedance path state controller 404, switch mode power conversion controller 406, and inactive state controller 408 are enabled and disabled. A logical 1 indicates enabled, and a logical 0 indicated disabled. Thus, the enable/disable states 608 depict one embodiment of how the controller 402 can coordinate the functions of low impedance path state controller 404, inactive state controller 408, and switch mode power conversion controller 406.

Figure 6B:
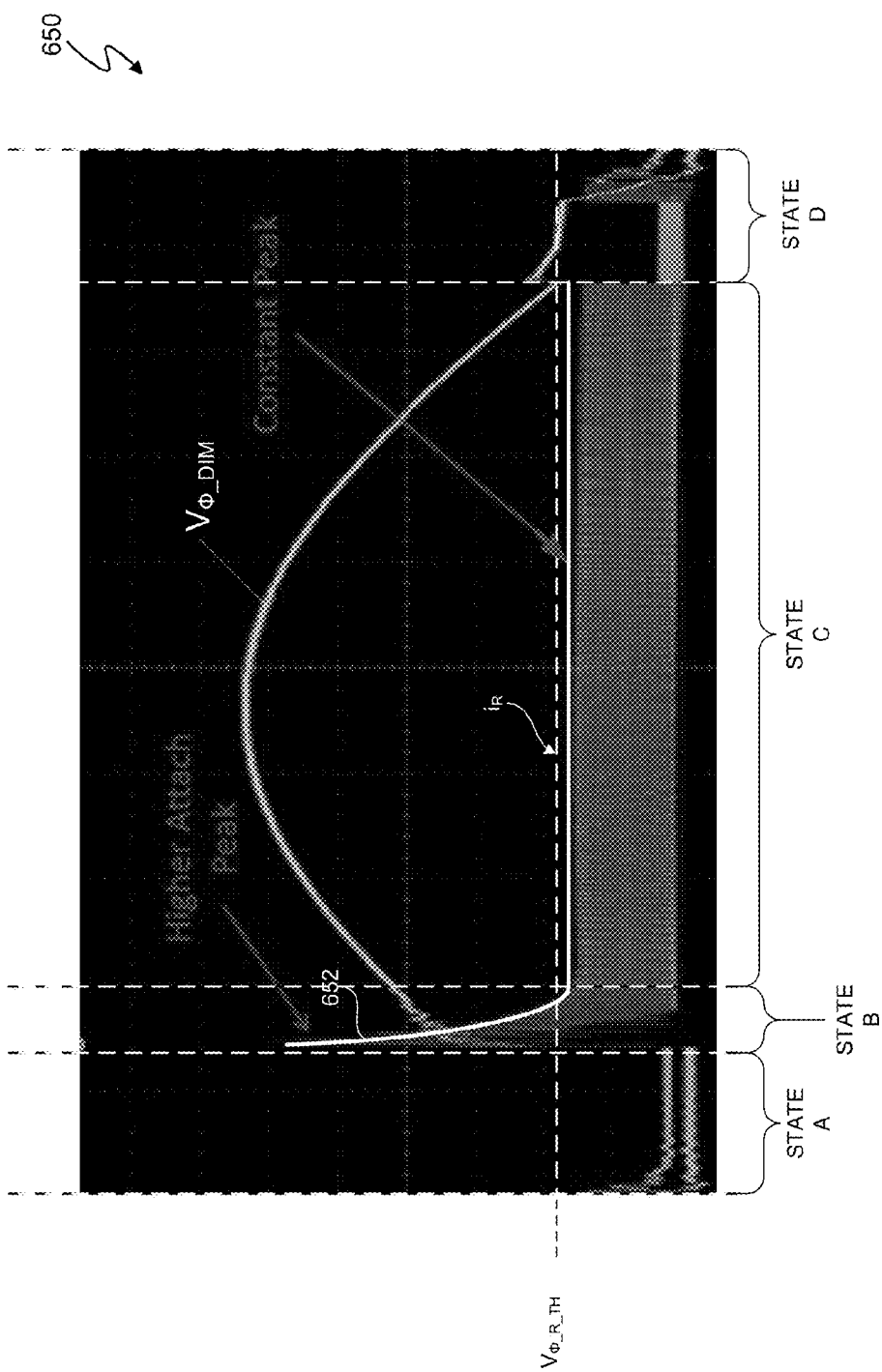
FIG. 6B depicts exemplary dimmer voltage and dimmer current waveforms in the electronic system of FIG. 4 when utilizing the controller function coordination process of FIG. 5.

FIG. 6B depicts exemplary dimmer voltage and dimmer current waveforms 650. During state A, the low impedance path state controller 404 keeps the dimmer current $i_{DIM}$ and dimmer voltage $V_{\phi\_DIM}$ at respectively approximately 0 A and 0V. At the beginning of state B, the leading edge of the dimmer voltage causes the dimmer current $i_{DIM}$ to peak at the "higher attach peak". During state B, the attach state controller 405 actively controls a decreasing transition of the dimmer current $i_{DIM}$ until the dimmer current $i_{DIM}$ reaches a steady state value, such as an approximately constant steady state peak value, RMS value, or mean value. The approximately constant steady state peak value is, for example, in a range of 25-75 mA. In at least one embodiment, the peak value of current in state B (referred to as the "peak attach current") is in a range of 300-800 mA. Superimposed curve 652 depicts an exemplary decreasing transition profile of the current $i_R$, which corresponds to the dimmer current $i_{DIM}$, during state B as the current $i_R$ through inductor 438 transitions from a peak value to an approximately constant steady state peak value. The actual profile of the dimmer current $i_{DIM}$ begins at the same peak current value as the current $i_R$, follows the same decreasing transition profile as indicated by curve 652 in state B except that the approximately constant steady state peak dimmer current $i_{DIM}$ in state C has a value equal to approximately one-half of the approximately constant steady state current $i_R$ in state C. The exemplary profile of the current $i_R$ and, thus, the dimmer current $i_{DIM}$, transfers energy to the power converter system 410 (FIG. 4) and damps the LC circuit 804 (FIG. 8) in the dimmer 801. At state C, the switch mode power conversion controller 406 boosts the link voltage $V_{LINK}$ until the dimmer voltage $V_{\phi\_DIM}$ reaches the dimmer threshold voltage $V_{\phi\_R\_TH}$. At state D, a digital inactive state controller 408 causes the dimmer current $i_{DIM}$ to decrease to approximately 0 A, and maintains the dimmer voltage $V_{\phi\_DIM}$ at approximately the dimmer threshold voltage $V_{\phi\_R\_TH}$ while digitally synthesizing the dimmer voltage $V_{\phi\_DIM}$.

The inactive state controller 408 can be implemented as a digital, analog, or as an analog and digital circuit. FIG. 7 depicts an inactive state controller 700, which represents one embodiment of inactive state controller 408. Inactive state controller 700 functions in part as a current source that controls the current $i_R$. Inactive state controller 700 includes a pull-down circuit 702 to pull-down current $i_R$ after a triac of dimmer 414 turns OFF, and a hold or "glue" circuit 704 to hold the emulated dimmer output voltage $V_{\phi\_R}$ to approximately 0V until the triac 106 fires in a next half-cycle of dimmer voltage $V_{DIM}$.

Since, in at least one embodiment, the supply voltage $V_{SUPPLY}$ is a cosine wave, and the current $i_R$ is directly related to the derivative of the emulated dimmer output voltage $V_{\phi\_R}$, an ideal relationship between the current $i_R$ and the emulated dimmer output voltage $V_{\phi\_R}$ for a half cycle of supply voltage $V_{SUPPLY}$ is a quarter sine wave. However, a linearly decreasing relationship between current $i_R$ and emulated dimmer output voltage $V_{\phi\_R}$ is a close approximation of a quarter sine wave. The current $i_R$ versus emulated dimmer output voltage $V_{\phi\_R}$ causes the power converter system 410 to generate an oval emulated dimmer output voltage $V_{\phi\_R}$, which is a close approximation to a phase cut supply voltage $V_{SUPPLY}$.

In general, the pull-down circuit 702 creates the linearly decreasing relationship between current $i_R$ and emulated dimmer output voltage $V_{\phi\_R}$. The pull-down circuit 702 includes an operational amplifier 705 which includes a non-inverting input terminal "+" to receive a pull-down reference voltage $V_{REF\_PD}$. A feedback loop with voltage divider R1 and R2 between the emulated dimmer output voltage $V_{\phi\_R}$ terminal 711 and voltage $V_B$ at node 712 creates an inverse relationship between voltage $V_B$ and emulated dimmer output voltage $V_{\phi\_R}$. Thus, as the emulated dimmer output voltage $V_{\phi\_R}$ decreases, operational amplifier 705 drives the gate of n-channel metal oxide semiconductor field effect transistor (NMOSFET) 708 to increase the voltage $V_B$ so that the voltage $V_A$ at the inverting terminal "−" matches the reference voltage $V_{REF\_PD}$ at the non-inverting terminal "+". Similarly, as the emulated dimmer output voltage $V_{\phi\_R}$ increases, operational amplifier 705 drives the gate of n-channel metal oxide semiconductor field effect transistor (NMOSFET) 708 to decrease the voltage $V_B$ so that the voltage $V_A$ at the inverting terminal "−" continues to match the reference voltage $V_{REF\_PD}$ at the non-inverting terminal "+".

The voltage $V_{DRIVE}$ at the gate of NMOSFET 706 maintains NMOSFET 706 in saturation mode. In at least one embodiment, voltage $V_{DRIVE}$ is +12V. The voltage $V_B$ across resistor 714 determines the value of current $i_R$, i.e. $i_R = V_B/R3$, and "R3" is the resistance value of resistor 714. Thus, current $i_R$ varies directly with voltage $V_B$ and, thus, varies inversely with emulated dimmer output voltage $V_{\phi\_R}$. From the topology of pull-down circuit 702, voltage $V_B$ is related to the reference voltage $V_{REF\_PD}$ in accordance with Equation 1:

$$V_B = V_{REF\_PD} \cdot \frac{R1 + R2}{R1} - \frac{R2 \cdot V_{\phi\_R}}{R1} \quad [1]$$

R1 is the resistance value of resistor 707, and R2 is the resistance value of resistor 709. If R1>>R2, then the voltage $V_B$ is represented by Equation 2:

$$V_B \approx V_{REF\_PD} - \frac{R2 \cdot V_{\phi\_R}}{R1} \quad [2]$$

Since $i_R = V_B/R3$, if R1 is 10 Mohms, R2 is 42 kohms, and R3 is 1 kohm, in accordance with Equation [2], $i_R$ is represented by Equation [3]:

$$i_R \approx 0.8\left(1 - \frac{V_{\phi\_R}}{190}\right) \text{ mA} \quad [3]$$

Once the pull-down circuit 702 lowers the emulated dimmer output voltage $V_{\phi\_R}$ to a glue down reference voltage $V_{REF\_GL}$, the glue-down circuit 704 holds the emulated dimmer output voltage $V_{\phi\_R}$ at or below a threshold voltage, such as approximately 0V, until the triac 106 fires and raises the emulated dimmer output voltage $V_{\phi\_R}$. The glue-down reference voltage $V_{REF\_GL}$ represents one embodiment of the zero crossing voltage threshold $V_{ZC\_TH}$ discussed in conjunction with FIG. 3. Comparator 716 of glue-down circuit 704 compares the emulated dimmer output voltage $V_{\phi\_R}$ with the glue-down reference voltage $V_{REF\_GL}$. The particular value of the glue-down reference voltage $V_{REF\_GL}$ is a matter of design choice. In at least one embodiment, voltage $V_{REF\_GL}$ is set so that the glue-down circuit 704 holds the voltage $V_{\phi\_R}$ to approximately 0V when the voltage $V_{\phi\_R}$ approaches 0V. In at least one embodiment, the glue-down reference voltage $V_{REF\_GL}$ is set to 5V. Since NMOSFET 706 operates in saturation mode, the voltage at node 710 is approximately equal to emulated dimmer output voltage $V_{\phi\_R}$. When emulated dimmer output voltage $V_{\phi\_R}$ is greater than the glue-down reference voltage $V_{REF\_GL}$, the output voltage $V_{COMP}$ of comparator 716 is a logical 0. In at least one embodiment, the comparator output voltage $V_{COMP}$ is passed directly as signal GLUE_ENABLE to a control terminal of switch 718. Switch 718 can be any type of switch and is, for example, an NMOSFET. When the comparator output voltage $V_{COMP}$ is a logical 0, switch 718 is OFF, and NMOSFETs 720 and 722 are also OFF. A transition of the comparator output voltage $V_{COMP}$ from a logical 1 to a logical 0 indicates a determined zero crossing of the dimmer voltage $V_{\phi\_R}$, which is used by operation 518 of controller function coordination process 500 (FIG. 5).

Figure 2:
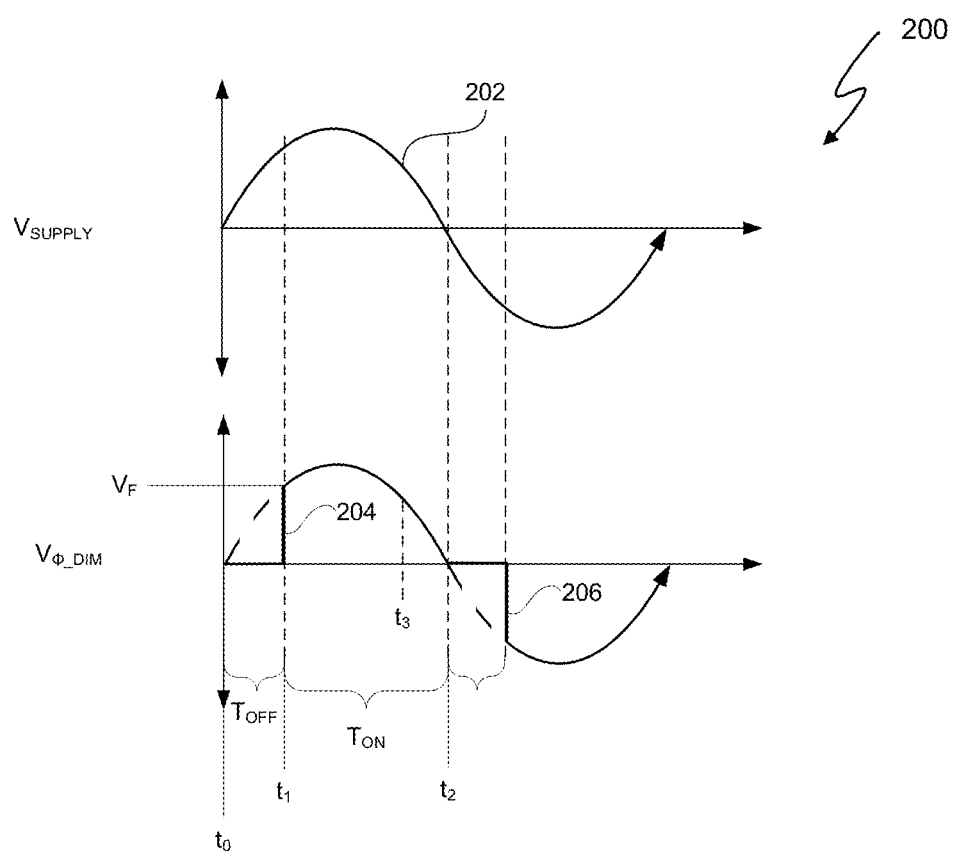
FIG. 2 (labeled prior art) depicts exemplary voltage graphs associated with the lighting system of FIG. 1.

When emulated dimmer output voltage $V_{\phi\_R}$ transitions from greater than to less than the glue-down reference voltage $V_{REF\_GL}$, the comparator output voltage $V_{COMP}$ changes from a logical 0 to a logical 1. A transition of the comparator output voltage $V_{COMP}$ from a logical 0 to a logical 1 indicates a determined leading edge of the dimmer voltage $V_{\phi\_R}$, which is used by operation 506 of controller function coordination process 500 (FIG. 5). When the comparator output voltage $V_{COMP}$ is a logical 1, NMOSFETs 720 and 722 conduct. NMOSFETs 720 and 722 are configured as a current mirror sharing a common gate terminal 724. A current source 726 generates a glue current $i_{GLUE}$, which is mirrored through NMOSFET 720. In at least one embodiment, when emulated dimmer output voltage $V_{\phi\_R}$ is less than glue-down reference voltage $V_{REF\_GL}$, current $i_R$ is approximately equal to the glue current $i_{GLUE}$. In at least one embodiment, the glue current $i_{GLUE}$ is set to a value large enough to hold the emulated dimmer output voltage $V_{\phi\_R}$ at approximately 0V until a triac of the dimmer 414 fires again. In at least one embodiment, the glue current $i_{GLUE}$ is low enough to minimize an error on a capacitor in the dimmer 414, such as the capacitor 121 in FIG. 2. In at least one embodiment, the error on the capacitor is a difference between a voltage across the capacitor and the dimmer voltage $V_{\phi\_DIM}$. Thus, the glue circuit 704 draws a steady state glue current $i_{GLUE}$ from the power converter system 410 to maintain the emulated dimmer output voltage $V_{\phi\_R}$ at or below a threshold voltage, such as approximately 0V, during a period of time from when the pull-down circuit 702 lowers the emulated dimmer output voltage $V_{\phi\_R}$ to the glue down reference voltage $V_{REF\_GL}$ until the triac 106 fires and raises the emulated dimmer output voltage $V_{\phi\_R}$.

In at least one embodiment, the glue circuit 704 also includes pull-down, glue logic ("P-G logic") 728. The P-G logic 728 generates the signal GLUE_ENABLE to control conductivity of switch 718. The particular function(s) of P-G logic 728 are a matter of design choice. For example, in at least one embodiment, P-G logic 728 enables and disables the glue-down circuit 704. In at least one embodiment, to enable and disable the glue-down circuit 704, P-G logic 728 determines whether the dimmer output voltage $V_{\phi\_DIM}$ contains any phase cuts as, for example, described in Grisamore I. If the dimmer output voltage $V_{\phi\_DIM}$ does not indicate any phase cuts, then the P-G logic 728 disables the glue down circuit 704 by generating the GLUE_ENABLE signal so that switch 718 does not conduct regardless of the value of comparator output voltage $V_{COMP}$. In at least one embodiment, P-G logic 728 includes a timer (not shown) that determines how often the comparator output voltage $V_{COMP}$ changes logical state. If the time between logical state changes is consistent with no phase cuts, P-G logic 728 disables the glue-down circuit 704. Additional, exemplary discussion of the inactive state controller 700 is described in Melanson I. The particular system and method of determining a zero crossing of the dimmer voltage $V_{\phi\_R}$ is a matter of design choice. U.S. provisional patent application No. 61/410,269 describes another exemplary system and method for determining a zero crossing of the dimmer voltage $V_{\phi\_R}$. U.S. provisional patent application No. 61/410,269, filed on Nov. 4, 2010, entitled "Digital Resynthesis of Input Signal Dimmer Compatibility", inventors John L. Melanson and Eric J. King, is hereby incorporated by reference in its entirety and referred to herein at "Melanson II".

Figure 9:
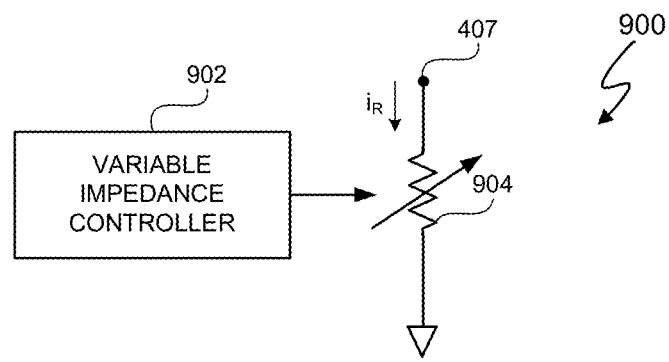
FIG. 9 depicts an embodiment of an attach state controller of FIG. 4.

FIG. 9 depicts an attach state controller 900, which represents one embodiment of the attach state controller 405 (FIG. 4). The attach state controller 900 includes a variable impedance controller 902 that controls a variable impedance 904. The current controller 902 controls the variable impedance 904 during state B so that the current $i_R$ transitions down to a predetermined, steady state hold value to prevent the dimmer from prematurely resetting. In at least one embodiment, the variable impedance 904 is a digitally controllable current digital-to-analog converter ("DAC").

Figure 10:
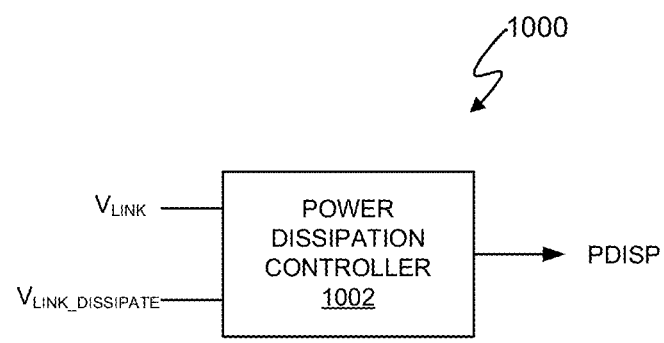
FIG. 10 depicts a power dissipation circuit.

FIG. 10 depicts a power dissipation circuit 1000 to generate the power dissipation control signal PDISP and control the power dissipation circuit 446 (FIG. 4). The power dissipation controller 1002 compares the link voltage $V_{LINK}$ to a dissipate threshold link voltage $V_{LINK\_DISSIPATE}$. If the link voltage $V_{LINK}$ is greater than the dissipate threshold link voltage $V_{LINK\_DISSIPATE}$, power dissipation controller 1002 generates a logical 1 value of power dissipation control signal PDISP to turn FET 448 ON and cause excess current to be dissipated through resistor 450. When the link voltage $V_{LINK}$ is less than the dissipate threshold link voltage $V_{LINK\_TARGET}$, there is no excess current to dissipate, and power dissipation controller 1002 generates a logical 0 power dissipation control signal PDISP to turn FET 448 OFF. In at least one embodiment, the dissipate threshold link voltage $V_{LINK\_DISSIPATE}$ is set to a voltage value higher than a target link voltage and within a range of voltages that provides an acceptable link voltage $V_{LINK}$. The link voltage $V_{LINK}$ decreases as the load 308 draws power, thus, causing the link voltage $V_{LINK}$ to decrease. Setting the dissipate threshold link voltage $V_{LINK\_DISSIPATE}$ higher than the target link voltage allows some margin for the link voltage $V_{LINK}$ to decrease prior to cycling the power dissipation control signal PDISP. In at least one embodiment, the dissipate threshold link voltage $V_{LINK\_DISSIPATE}$ is within 3% of a target link voltage. The particular target link voltage is a matter of design choice, and, in at least one embodiment, depends on the voltage parameters of the load 308 (FIG. 4). In at least one embodiment, the target link voltage is 400V.

Figure 11:
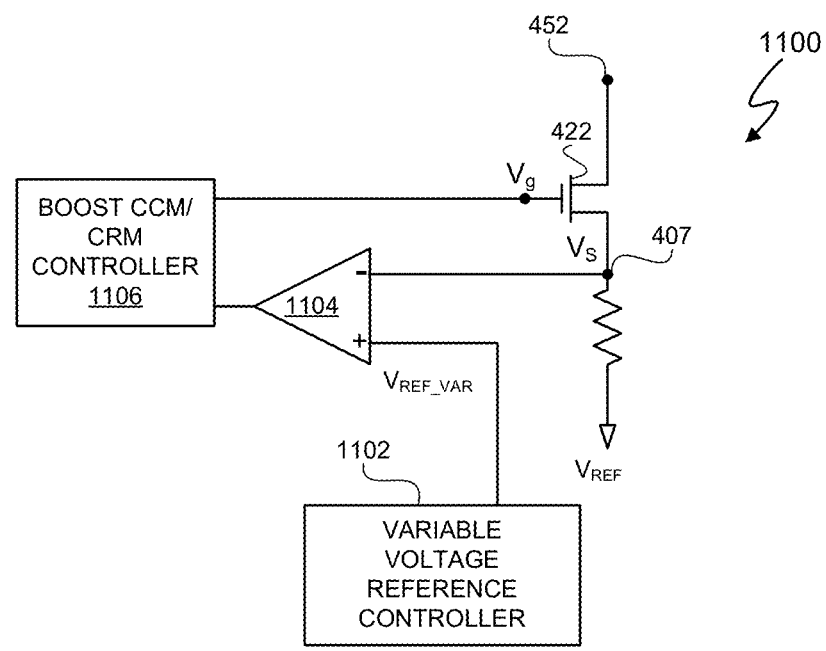
FIG. 11 depicts an embodiment of an attach state controller of FIG. 4.

FIG. 11 depicts an attach state controller 1100, which represents one embodiment of the attach state controller 405 (FIG. 4). The attach state controller 1100 includes a variable voltage reference controller 1102 that provides a variable reference voltage $V_{REF\_VAR}$ to control the gate of FET 422. The variable voltage reference controller 1102 varies the variable reference voltage $V_{REF\_VAR}$ in a decreasing transition so that the dimmer current $i_{DIM}$ transitions down to a steady state value without causing a triac of the dimmer 411 to prematurely reset.

Comparator 1104 compares the variable reference voltage $V_{REF\_VAR}$ with the source voltage $V_S$ of FET 422. If the source voltage $V_S$ falls below the variable reference voltage $V_{REF\_VAR}$, the comparator 1104 generates a logical 1 output signal. If the source voltage $V_S$ is greater than the variable reference voltage $V_{REF\_VAR}$, the comparator 1104 generates a logical 0 output signal. The boost CCM/CRM engine 1106 receives the output of comparator 1104 and generates a gate voltage $V_g$ at the gate of FET 422 to control conductivity of FET 422. In at least one embodiment, the boost CCM/CRM controller 1106 operates the FET 422 as a switch, i.e. operates the FET 422 either ON in saturation mode or OFF. In at least one embodiment, the boost controller 1106 controls the gate voltage $V_g$ of FET 422 to operate the switching power converter 436 in CCM mode during the attach state while responding to the comparison output signal of the comparator 1104 to drive the source voltage $V_S$ of FET 422 to the level of the variable reference voltage $V_{REF\_VAR}$. Controlling the gate voltage $V_g$ of the FET 422 controls the source current $i_R$. Controlling the source current $i_R$ also controls the dimmer current $i_{DIM}$. Thus, the attach state controller 1104 controls the gate voltage $V_g$ of FET 422 to actively control a decreasing transition of the dimmer current to prevent a triac of the dimmer 414 from prematurely resetting. The particular implementation of the variable voltage source 1102 is a matter of design choice and can be implemented, for example, as a variable voltage resistor ladder.

Figure 12:
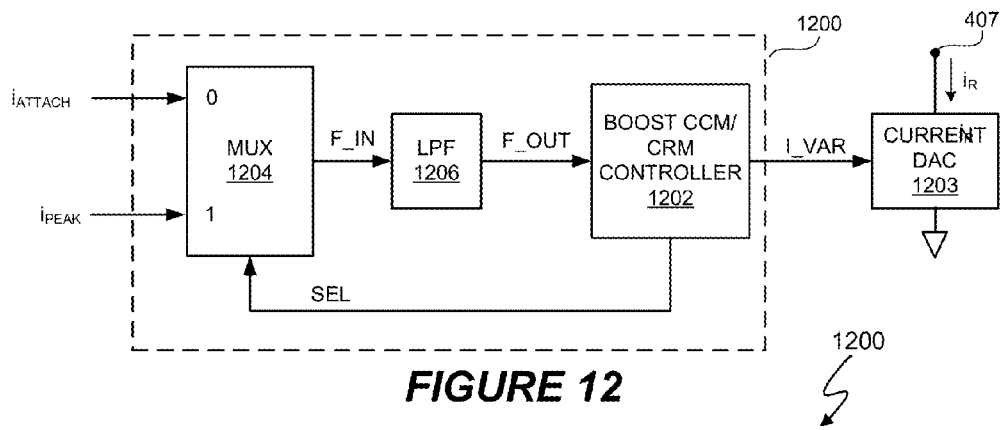
FIG. 12 depicts a current controller.

FIG. 12 depicts a current controller 1200, which represents one embodiment of the variable impedance controller 902. FIG. 13 depicts exemplary waveforms 1300 associated with the current controller 1200. Referring to FIGS. 12 and 13, the boost CCM/CRM controller 1202 generates a select signal SEL to select the attach current value $i_{ATTACH}$ during states A and D and selects the peak current value $i_{PEAK}$ during states B and C. The attach current value $i_{ATTACH}$ represents an expected peak value of the dimmer current $i_{DIM}$ at the leading edge of the rectified input voltage $V_{\phi\_R}$. The peak current value $i_{PEAK}$ represents a desired steady state peak current value of the dimmer current $i_{DIM}$. During state D, the boost engine generates a digital control signal I_VAR to turn the current DAC 1203 OFF. At the transition from state A to state B, i.e. at the leading edge of the rectified input voltage $V_{\phi\_R}$, the boost CCM/CRM controller 1202 causes the 2:1 multiplexer 1204 to select the peak current value $i_{PEAK}$ as the input value F_IN to the low pass filter 1206. During states B and C, the low pass filter 1206 generates a filter output signal F_OUT that has a decreasing value that tracks a decreasing function, such as a function corresponding to the curve 652 (FIG. 6B). In at least one embodiment, the low pass filter 1206 is a digital low pass filter that has a transfer function with coefficients that during state B (the attach state) provide a decreasing profile for the current $i_R$ and, thus, the dimmer current $i_{DIM}$. In at least one embodiment, the transfer function is based on transferring energy to the load 308 to reach a steady state approximately constant value of the dimmer current $i_{DIM}$ within a particular amount of time, such as approximately 50 μsec. In at least one embodiment, the transfer function is based on transferring energy to the load 308 to maintain a particular voltage in the power converter system 410, the load 308, or the dimmer 414. In at least one embodiment, the transfer function is based on both time and voltage. In at least one embodiment, the coefficients are programmed into the controller 402 (FIG. 4) and are determined empirically from test data associated with test dimmers. The boost CCM/CRM controller 1202 converts the filter output signal F_OUT into a corresponding value of the digital control signal I_VAR. The current DAC 1203 responds to the decreasing transition of the digital control signal I_VAR by controlling a decreasing transition of the current $i_R$, which controls a decreasing transition of the dimmer current $i_{DIM}$ as, for example, shown in FIG. 6B. At the beginning of state D, the boost CCM/CRM controller 1202 cycles the select signal SEL to select the attach current value $i_{ATTACH}$ in preparation for the next cycle of the rectified input voltage $V_{\phi\_R}$.

In at least one embodiment, the boost CCM/CRM controller 1202 generates the control signal I_VAR to operate the switching power converter 436 in CCM mode while actively controlling a decreasing transition of the current $i_R$, and, thus, the dimmer current $i_{DIM}$, until the dimmer current reaches an approximately constant steady state value, such as an approximately constant peak value, RMS value, or average value. In at least one embodiment, when the dimmer current reaches the approximately constant steady state value, the switch mode power conversion controller 406 operates the boost CCM/CRM controller 1202 to control the switching power converter 436 as previously described.

Figure 14:
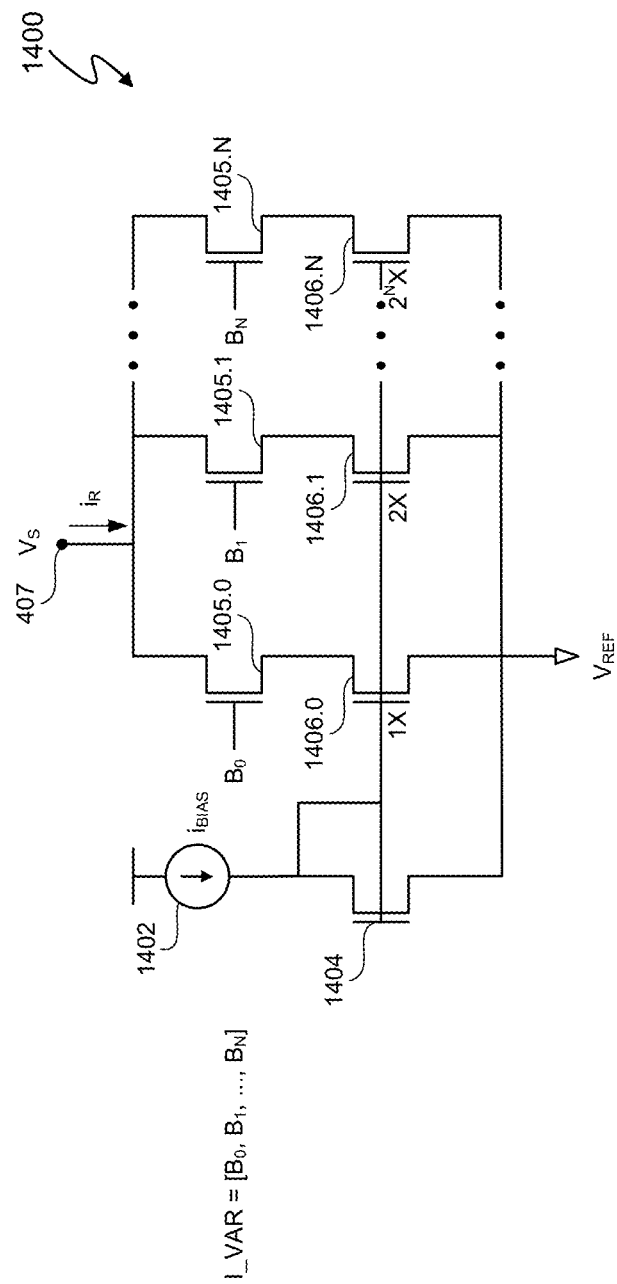
FIG. 14 depicts a digitally controllable current source.

FIG. 14 depicts a digitally controllable current source 1400, which represents one embodiment of DAC 1203 and variable impedance 904. During operation, current source 1400 sources current from source voltage node 407. Sourcing current from source voltage node 407 discharges source voltage node 407 to a voltage approximately equal to the reference voltage $V_{REF}$. Thus, during operation current source 1400 provides a low impedance path for current $i_R$.

Current source 1400 includes a bias current source 1402 that generates a bias current $i_{BIAS}$. A drain and gate of FET 1404 are connected together to form a "diode connected" configuration. The N+1 series connected FET pairs 1405.0/1406.0 through 1405.N/1406.N are respectively configured in a current mirror arrangement with FET 1404 to mirror the bias current $i_{BIAS}$. "N" is an integer, and the value of N is a matter of design choice. Each pair of FETs 1405.X/1406.X is sized so that each subsequent pair sources twice as much current as the previous pair, e.g. FET pair 1405.1/1406.1 sources twice as much current as FET pair 1405.0/1406.0, and so on. "X" is an integer index ranging from 0 to N. In at least one embodiment, the value of N determines a maximum level of current capable of being sourced through current source 1400.

In at least one embodiment, the variable impedance control signal I_VAR is a digital value having N+1 bits, i.e. I_VAR=[$B_0, B_1, \ldots, B_N$]. Each bit $B_0, B_1, \ldots, B_N$ is applied to the gate of a respective FET pair 1405.0/1406.0, 1405.1/1406.1, . . . , 1405.N/1406.N to control conductivity of the FET pairs. To operate the current source 1400, boost controller CCM/CRM controller 1202 (FIG. 12) sets a logical value of I_VAR to set bits [$B_0, B_1, \ldots, B_N$]. For example, to turn all of the FET pairs ON, boost controller CCM/CRM controller 1202 sets [$B_0, B_1, \ldots, B_N$]=[1, 1, . . . , 1] to cause each FET pair 1405.0/1406.0, 1405.1/1406.1, . . . , 1405.N/1406.N to conduct and sets bits to a logical value of I_VAR to $B_0, B_1, \ldots, B_N$=[0, 0, . . . , 0] to cause each FET pair 1405.0/1406.0, 1405.1/1406.1, . . . , 1405.N/1406.N to turn "off", i.e. nonconductive. In at least one embodiment, to boost controller CCM/CRM controller 1202 decreases the value of bits [$B_0, B_1, \ldots, B_N$] so that the current $i_R$ follows the decreasing transition set by the filter output signal F_OUT and switching power converter 436 (FIG. 4) operates in CCM mode.

Thus, an electronic system includes a controller that coordinates (i) a low impedance path for a dimmer current, (ii) attaching a dimmer to an interface of a power converter system at the leading edge of a phase-cut, rectified input voltage, (iii), control of switch mode power conversion, and (iv) an inactive state to, for example, provide compatibility between a dimmer and a load, prevent the dimmer from prematurely resetting during an attach state, and reduce the dimmer current while allowing a dimmer to function normally from cycle to cycle of an alternating current (AC) supply voltage.

Although embodiments have been described in detail, it should be understood that various changes, substitutions, and alterations can be made hereto without departing from the spirit and scope of the invention as defined by the appended claims.

What is claimed is:

1. An apparatus comprising:
 a controller configured to:

sense a leading edge of a dimmer input voltage; and
after the sensing the leading edge of the dimmer input voltage, actively control a continuous, decreasing transition of a current through a triac-based dimmer until the current through the triac-based dimmer reaches a holding current value to prevent a triac of the dimmer from prematurely resetting;
wherein the controller comprises:
a multiplexer having an attach current value input and a peak current value input;
a low pass filter coupled to an output of the multiplexer to generate an output signal having a decreasing transition from the attach current value to the peak current value; and
a boost controller coupled to the low pass filter to control current through the dimmer in accordance with the output signal of the low pass filter.

2. The apparatus of claim 1 wherein to actively control a continuous decreasing transition of a current, the controller is configured to:
vary an impedance of a variable impedance so that the current through the triac-based dimmer tracks a decreasing function set by a low pass filter.

3. The apparatus of claim 1 wherein the controller includes a digitally controlled current digital-to-analog converter (DAC) and the controller is further configured to vary the impedance by varying current through the DAC.

4. The apparatus of claim 1 further comprising:
a power converter system coupled to the controller, wherein the power converter system includes a switching power converter, and the controller is configured to control power conversion of the power converter system including controlling the switching power converter.

5. The apparatus of claim 1 wherein to actively control the continuous decreasing transition of the current through a triac-based dimmer to prevent the triac of the dimmer from prematurely resetting, the controller is further configured to:
actively control the continuous decreasing transition of the current through the triac-based dimmer until a value of the triac current reaches a predetermined steady state value above a hold current value of the triac-based dimmer.

6. The apparatus of claim 5 wherein the predetermined steady state value is a member of a group consisting of: (i) a mean value of the current through the triac-based dimmer, (ii) a mean value of the peak current through the triac-based dimmer, (iii) a root mean square value of the current through the triac-based dimmer, and (iv) a root mean square value of the peak current through the triac-based dimmer.

7. The apparatus of claim 1 wherein to actively control the continuous decreasing transition of the current through the triac-based dimmer to prevent the triac of the dimmer from prematurely resetting further comprises:
to control conductivity of a transistor of a power converter system to control current through the transistor and thereby controlling the current through the triac-based dimmer.

8. The apparatus of claim 7 wherein:
the transistor comprises a field effect transistor; and
to control conductivity of the transistor of the power converter system to control current through the transistor and thereby controlling the current through the triac-based dimmer comprises:
to control conductivity of the field effect transistor to control a source current through the field effect transistor and thereby controlling the current through the triac-based dimmer.

9. The apparatus of claim 8 wherein to control conductivity of the field effect transistor to control the source current through the field effect transistor and thereby controlling the current through the triac-based dimmer comprises:
to control the source current with an output signal of a digital-to-analog converter.

10. The apparatus of claim 1 further comprising:
a switching power converter coupled to the controller; and
a load coupled to the switching power converter, wherein the load comprises one or more light emitting diodes.

11. A lighting system comprising:
a switching power converter having one or more inputs to couple to a triac-based dimmer;
one or more light emitting diodes coupled to an output of the switching power converter;
a controller, coupled to the switching power converter, and configured to:
sense a leading edge of a dimmer input voltage;
after the sensing the leading edge of the dimmer input voltage, actively controlling a continuous, decreasing transition of a current through a triac-based dimmer until the current through the triac-based dimmer reaches a holding current value to prevent a triac of the dimmer from prematurely resetting; and
control the switching power converter to control power delivered to the light emitting diodes during operation of the lighting system;
wherein the controller comprises:
a multiplexer having an attach current value input and a peak current value input;
a low pass filter coupled to an output of the multiplexer to generate an output signal having a decreasing transition from the attach current value to the peak current value; and
a boost controller coupled to the low pass filter to control current through the dimmer in accordance with the output signal of the low pass filter.

12. The lighting system of claim 11 wherein to actively control a continuous decreasing transition of a current, the controller is configured to:
vary an impedance of a variable impedance so that the current through the triac-based dimmer tracks a decreasing function set by a low pass filter.

13. The lighting system of claim 11 wherein the controller includes a digitally controlled current digital-to-analog converter (DAC) and the controller is further configured to vary the impedance by varying current through the DAC.

14. The lighting system of claim 11 further comprising:
a power converter system coupled to the controller, wherein the power converter system includes a switching power converter, and the controller is configured to control power conversion of the power converter system including controlling the switching power converter.

15. The lighting system of claim 11 wherein to actively control the continuous decreasing transition of the current through a triac-based dimmer to prevent the triac of the dimmer from prematurely resetting, the controller is further configured to:
actively control the continuous decreasing transition of the current through the triac-based dimmer until a value of the triac current reaches a predetermined steady state value above a hold current value of the triac-based dimmer.

16. The lighting system of claim 15 wherein the predetermined steady state value is a member of a group consisting of: (i) a mean value of the current through the triac-based dimmer, (ii) a mean value of the peak current through the triac-based dimmer, (iii) a root mean square value of the current through the triac-based dimmer, and (iv) a root mean square value of the peak current through the triac-based dimmer.

17. The lighting system of claim 11 wherein:

the switching power converter further comprises a transistor; and to actively control the continuous decreasing transition of the current through the triac-based dimmer to prevent the triac of the dimmer from prematurely resetting further comprises:

to control conductivity of a transistor of a power converter system to control current through the transistor and thereby controlling the current through the triac-based dimmer.

18. The lighting system of claim 17 wherein:

the transistor comprises a field effect transistor; and to control conductivity of the transistor of the power converter system to control current through the transistor and thereby controlling the current through the triac-based dimmer comprises:

to control conductivity of the field effect transistor to control a source current through the field effect transistor and thereby controlling the current through the triac-based dimmer.

19. The lighting system of claim 18 wherein to control conductivity of the field effect transistor to control the source current through the field effect transistor and thereby controlling the current through the triac-based dimmer comprises:

to control the source current with an output signal of a digital-to-analog converter.

* * * * *